US009479056B2

(12) United States Patent
Parakulam et al.

(10) Patent No.: US 9,479,056 B2
(45) Date of Patent: Oct. 25, 2016

(54) BUCK-BOOST CIRCUIT WITH PROTECTION FEATURE

(71) Applicant: Deeya Energy, Inc., Fremont, CA (US)

(72) Inventors: Gopalakrishnan R Parakulam, Cupertino, CA (US); Binod Agrawal, Gurgaon (IN); Saroj Kumar Sahu, Mountain House, CA (US)

(73) Assignee: IMERGY POWER SYSTEMS, INC., Fremont, CA (US)

( * ) Notice: Subject to any disclaimer, the term of this patent is extended or adjusted under 35 U.S.C. 154(b) by 214 days.

(21) Appl. No.: 14/275,618

(22) Filed: May 12, 2014

(65) Prior Publication Data

US 2014/0266096 A1    Sep. 18, 2014

Related U.S. Application Data

(62) Division of application No. 12/790,783, filed on May 28, 2010, now Pat. No. 8,723,489.

(60) Provisional application No. 61/182,082, filed on May 28, 2009.

(51) Int. Cl.
*G05F 1/00* (2006.01)
*H02M 3/158* (2006.01)
*H02M 1/32* (2007.01)

(52) U.S. Cl.
CPC ............ *H02M 3/1582* (2013.01); *H02M 1/32* (2013.01); *H02M 3/1584* (2013.01); *Y10T 307/406* (2015.04)

(58) Field of Classification Search
CPC .. H02M 3/1582; H02M 1/32; H02M 3/1584; H02M 3/156; H02M 3/157; Y10T 307/406

USPC ....... 323/259, 268, 271, 272, 282, 285, 290, 323/344
See application file for complete search history.

(56) References Cited

U.S. PATENT DOCUMENTS 3,540,934 A    11/1970    Boeke
3,996,064 A    12/1976    Thaller
(Continued)

FOREIGN PATENT DOCUMENTS

DE    102006007206    10/2006
JP    60047373    3/1985
(Continued)

OTHER PUBLICATIONS

Patent Cooperation Treaty (PCT), International Search Report/Written Opinion of the International Searching Authority for related PCT Application No. PCT/US2010/036770, date of mailing Dec. 15, 2010, pp. 1-7.*

(Continued)

*Primary Examiner* — Adolf Berhane
*Assistant Examiner* — Alex Torres-Rivera
(74) *Attorney, Agent, or Firm* — Haynes & Boone, LLP

(57) ABSTRACT

In accordance with some embodiments, a buck-boost circuit is contemplated which is bi-directional. That is, the buck-boost circuit be configured to produce a load voltage for a load responsive to a source voltage from a voltage source, and the buck-boost circuit may also be configured to produce a charging voltage for the voltage source responsive to a second voltage source connected to the load. In an embodiment, the buck-boost circuit may be operating in boost mode when providing the load voltage and may be operating in buck mode when providing the charging voltage.

20 Claims, 28 Drawing Sheets

(56) References Cited

U.S. PATENT DOCUMENTS

| | | | |
|---|---|---|---|
| 4,133,941 A | 1/1979 | Sheibley | |
| 4,159,366 A | 6/1979 | Thaller | |
| 4,309,372 A | 1/1982 | Sheibley | |
| 4,312,735 A | 1/1982 | Grimes et al. | |
| 4,414,090 A | 11/1983 | D'Agostino et al. | |
| 4,454,649 A | 6/1984 | Jalan et al. | |
| 4,468,441 A | 8/1984 | D'Agostino et al. | |
| 4,485,154 A | 11/1984 | Remick et al. | |
| 4,496,637 A | 1/1985 | Shimada et al. | |
| 4,543,302 A | 9/1985 | Gahn et al. | |
| 4,732,827 A | 3/1988 | Kaneko et al. | |
| 4,784,924 A | 11/1988 | Savinell et al. | |
| 4,814,241 A | 3/1989 | Nagashima et al. | |
| 4,828,666 A | 5/1989 | Iizuka et al. | |
| 4,874,483 A | 10/1989 | Wakabayashi et al. | |
| 4,882,241 A | 11/1989 | Heinzel | |
| 4,894,294 A | 1/1990 | Ashizawa et al. | |
| 4,929,325 A | 5/1990 | Bowen et al. | |
| 4,945,019 A | 7/1990 | Bowen et al. | |
| 4,948,681 A | 8/1990 | Zagrodnik et al. | |
| 4,956,244 A | 9/1990 | Shimizu et al. | |
| 5,061,578 A | 10/1991 | Kozuma et al. | |
| 5,162,168 A | 11/1992 | Downing et al. | |
| 5,188,911 A | 2/1993 | Downing et al. | |
| 5,258,241 A | 11/1993 | Ledjeff et al. | |
| 5,366,824 A | 11/1994 | Nozaki et al. | |
| 5,648,184 A | 7/1997 | Inoue et al. | |
| 5,656,390 A | 8/1997 | Kageyama et al. | |
| 5,665,212 A | 9/1997 | Zhong et al. | |
| 5,759,711 A | 6/1998 | Miyabayashi et al. | |
| 5,851,694 A | 12/1998 | Miyabayashi et al. | |
| 6,005,183 A | 12/1999 | Akai et al. | |
| 6,014,322 A | 1/2000 | Higashi et al. | |
| 6,040,075 A | 3/2000 | Adcock et al. | |
| 6,086,643 A | 7/2000 | Clark et al. | |
| 6,222,282 B1 | 4/2001 | Rossi et al. | |
| 6,222,352 B1 | 4/2001 | Lenk | |
| 6,461,772 B1 | 10/2002 | Miyake et al. | |
| 6,475,661 B1 | 11/2002 | Pellegri et al. | |
| 6,509,119 B1 | 1/2003 | Kobayashi et al. | |
| 6,524,452 B1 | 2/2003 | Clark et al. | |
| 6,555,267 B1 | 4/2003 | Broman et al. | |
| 6,562,514 B1 | 5/2003 | Kazacos et al. | |
| 6,692,862 B1 | 2/2004 | Zocchi | |
| 6,737,840 B2 | 5/2004 | McDonald et al. | |
| 6,759,158 B2 | 7/2004 | Tomazic | |
| 6,761,945 B1 | 7/2004 | Adachi et al. | |
| 6,764,789 B1 | 7/2004 | Sekiguchi et al. | |
| 6,768,047 B2 | 7/2004 | Chang | |
| 6,905,797 B2 | 6/2005 | Broman et al. | |
| 6,986,966 B2 | 1/2006 | Clarke et al. | |
| 7,046,531 B2 | 5/2006 | Zocchi et al. | |
| 7,061,205 B2 | 6/2006 | Shigematsu et al. | |
| 7,078,123 B2 | 7/2006 | Kazacos et al. | |
| 7,181,183 B1 | 2/2007 | Hennessy et al. | |
| 7,184,903 B1 | 2/2007 | Williams et al. | |
| 7,199,550 B2 | 4/2007 | Tsutsui et al. | |
| 7,220,515 B2 | 5/2007 | Ito et al. | |
| 7,227,275 B2 | 6/2007 | Hennessy et al. | |
| 2002/0144163 A1* | 10/2002 | Goodfellow | H02J 1/102 713/300 |
| 2003/0008203 A1 | 1/2003 | Winter | |
| 2004/0070370 A1 | 4/2004 | Emura | |
| 2004/0170893 A1 | 9/2004 | Nakaishi et al. | |
| 2004/0202915 A1 | 10/2004 | Nakaishi et al. | |
| 2004/0239299 A1 | 12/2004 | Vinciarelli | |
| 2004/0241544 A1 | 12/2004 | Nakaishi et al. | |
| 2005/0074653 A1 | 4/2005 | Broman et al. | |
| 2005/0156431 A1 | 7/2005 | Hennessy | |
| 2005/0156432 A1 | 7/2005 | Hennessy | |
| 2005/0158615 A1 | 7/2005 | Samuel et al. | |
| 2005/0164075 A1 | 7/2005 | Kumamoto et al. | |
| 2005/0181273 A1 | 8/2005 | Deguchi et al. | |
| 2005/0194951 A1* | 9/2005 | Mehas | H02M 1/36 323/282 |
| 2005/0260473 A1 | 11/2005 | Wang | |
| 2006/0014054 A1 | 1/2006 | Sugawara | |
| 2006/0092588 A1 | 5/2006 | Realmuto et al. | |
| 2006/0187689 A1 | 8/2006 | Hartular | |
| 2007/0072067 A1 | 3/2007 | Symons et al. | |
| 2007/0080666 A1 | 4/2007 | Ritter et al. | |
| 2007/0111089 A1 | 5/2007 | Swan | |
| 2007/0176726 A1 | 8/2007 | Xu et al. | |
| 2007/0273340 A1 | 11/2007 | Miller et al. | |
| 2008/0081247 A1 | 4/2008 | Nakaishi et al. | |
| 2008/0193828 A1 | 8/2008 | Sahu | |
| 2008/0219031 A1* | 9/2008 | Kernahan | H02M 1/15 363/21.01 |
| 2009/0015229 A1* | 1/2009 | Kotikalapoodi | H02M 3/1582 323/285 |
| 2009/0146671 A1* | 6/2009 | Gazit | G01S 3/7861 324/713 |
| 2009/0152949 A1* | 6/2009 | Adragna | H02J 1/102 307/31 |
| 2009/0218984 A1 | 9/2009 | Parakulam | |
| 2009/0230927 A1 | 9/2009 | Patterson | |
| 2010/0003586 A1 | 1/2010 | Sahu | |
| 2010/0090651 A1 | 4/2010 | Sahu | |
| 2010/0092757 A1 | 4/2010 | Nair | |
| 2010/0092807 A1 | 4/2010 | Sahu | |
| 2010/0092813 A1 | 4/2010 | Sahu | |
| 2010/0092843 A1 | 4/2010 | Conway | |
| 2010/0094468 A1 | 4/2010 | Sahu | |
| 2010/0136455 A1 | 6/2010 | Winter | |
| 2010/0143781 A1 | 6/2010 | Keshavarz | |
| 2011/0086247 A1 | 4/2011 | Keshavarz et al. | |

FOREIGN PATENT DOCUMENTS

| | | |
|---|---|---|
| JP | 60070672 | 4/1985 |
| JP | 60115174 | 6/1985 |
| JP | 1060967 | 3/1989 |
| JP | 1320776 | 12/1989 |
| JP | 2027667 | 1/1990 |
| JP | 2027668 | 1/1990 |
| JP | 3017963 | 1/1991 |
| JP | 8007913 | 1/1996 |
| JP | 10012260 | 1/1998 |
| JP | 10208766 | 8/1998 |
| JP | 11329474 | 11/1999 |
| JP | 2000058099 | 2/2000 |
| JP | 2000200619 | 7/2000 |
| JP | 2002015762 | 1/2002 |
| JP | 2002175822 | 6/2002 |
| JP | 2002289233 | 10/2002 |
| JP | 2002367661 | 12/2002 |
| JP | 2003173812 | 6/2003 |
| JP | 2005142056 | 6/2005 |
| JP | 2005228622 | 8/2005 |
| JP | 2005228633 | 8/2005 |
| JP | 2005322447 | 11/2005 |
| JP | 2006107988 | 4/2006 |
| JP | 2006114360 | 4/2006 |
| JP | 2006147306 | 6/2006 |
| JP | 2006147376 | 6/2006 |
| JP | 2006313691 | 11/2006 |
| JP | 2006351346 | 12/2006 |
| JP | 2007087829 | 4/2007 |
| WO | 8905528 WO | 6/1989 |
| WO | 9003666 | 4/1990 |
| WO | 0017991 | 3/2000 |
| WO | 03005476 | 1/2003 |
| WO | 2004079849 | 9/2004 |
| WO | 2006135958 | 12/2006 |

OTHER PUBLICATIONS

International Search Report/Written Opinion for related PCT Application No. PCT/US2010/036770, date of mailing Dec. 15, 2010.
Office Action for U.S. Appl. No. 12/217,059 mailed Aug. 23, 2010.
Search Report for PCT Application No. PCT/US2009/049285.
Office Action for U.S. Appl. No. 12/577,137 mailed Sep. 7, 2010.

* cited by examiner

BUCK-BOOST CIRCUIT WITH PROTECTION FEATURE

PRIORITY CLAIM

This application is a divisional of U.S. patent application Ser. No. 12/790,783 filed May 28, 2010, and claims the benefit of U.S. Provisional Application No. 61/182,082 entitled "BUCK-BOOST CONTROL CIRCUIT" filed on May 28, 2009, the disclosures of which are hereby incorporated by reference.

BACKGROUND OF THE INVENTION

1. Field of the Invention

Embodiments disclosed herein may be directed to a circuit for controlling a buck-boost operation performed by one or more buck-boost converters.

2. Description of the Related Art

A buck-boost converter is a DC-DC converter that typically produces an output voltage which is either greater than or less than the input voltage. The buck-boost converter may further be seen as a switch mode power supply having a similar circuit topology from individual buck and boost converters. FIG. 1 is a diagram illustrating a conventional buck-boost converter 100. As shown in FIG. 1, buck-boost converter 100 includes a power source 102 coupled in parallel to an inductor 104, a capacitor 106, and a load 108, shown in FIG. 1 as a resistor. Buck-boost converter also includes a diode 110 and a switch 112. In operation, when switch 112 is closed, voltage source 102 is directly coupled to inductor 104 transferring current to inductor 104, resulting in the accumulation of energy in inductor 104, or the charging of inductor 104. As a result, capacitor 106 supplies current to load 108 and inductor 104 acts as a load as it charges, resulting in a lower output voltage. This lower output voltage is termed a "step-down" voltage or a "buck" voltage. When switch 112 is open, as shown in FIG. 1, inductor 104 is directly coupled to load 108 and capacitor 106, and therefore current is supplied to capacitor 106 and load 108 from inductor 104 as inductor 104 discharges, if inductor 104 has been previously charged. Inductor 104 thus acts as a current source, and provides a higher output voltage. This higher output voltage is termed a "step-up" or "boost" voltage.

Typical buck-boost converters, such as shown in FIG. 1 produce an output voltage having a polarity that is opposite to the polarity of the input voltage. In addition, the output buck voltage range may be theoretically between 0 and the input voltage, and the output boost voltage may be theoretically between the input voltage and ∞. The output voltage is adjustable based on a duty cycle of a transistor which controls switch 112.

Buck-boost converter 100 often requires complicated driving circuitry because switch 112 does not have a terminal at ground, and produces an output voltage which has a polarity opposite to the polarity of the input voltage. However, these drawbacks are minimized when voltage source 102 is a battery. As a result, buck-boost converters may often be found in battery-powered circuits to provide a variable output voltage.

Conventional buck-boost circuits, however, cannot quickly be switched. Therefore, there is a need for buck-boost circuits capable of fast switching between buck and boost modes. Conventional buck-boost circuits usually buck or boost the input voltage to obtain a constant output voltage. Thus, the conventional buck-boost circuits are unidirectional. That is, the conventional buck-boost circuits buck/boost the input voltage to produce the output voltage but are not capable of bucking/boosting from the output to the input. In the case that a battery is the source of the input voltage, for example, the battery cannot be charged through the buck-boost circuit. In some cases, e.g. when the battery is a Redox battery, a wide input voltage range from the Redox battery needs to be accommodated. There is also a need for a buck-boost circuit that can be controlled externally (e.g. by a processor).

SUMMARY OF THE INVENTION

In accordance with some embodiments, a buck-boost circuit is contemplated which is bi-directional. That is, the buck-boost circuit may be configured to produce a boost voltage on a Bbus responsive to a source voltage from a voltage source on Cbus. The buck-boost circuit may also be configured to produce a charging (buck) voltage for the voltage source on the Cbus responsive to a second voltage source connected to the Bbus. In an embodiment, the buck-boost circuit may be operating in boost mode when providing the boost voltage and may be operating in buck mode when providing the charging voltage.

In accordance with some embodiments, a buck-boost circuit may control the output voltage (load or charging) in a range from 0 through the full voltage supported in the system. The buck-boost circuit may, in an embodiment used with a flow cell battery, may provide plating currents at the low voltages desired for plating, for example. A controller such as a processor executing software that monitors the buck-boost circuit or hardware monitor circuitry may provide a control input to the buck-boost circuit, which may modify a feedback voltage to the buck and/or boost controllers to change the output voltage. For example, the feedback voltage may be shifted with respect to ground. In an embodiment, the response of the output voltage to the control input may be rapid. In an embodiment, a controller such as a processor or monitor hardware may monitor the current produced from the buck-boost circuit and may use the control input (which may be a voltage) to increase or decrease the total current available to the output (load or charging current), to produce a desired amount of output current.

In some embodiments, the buck-boost circuit may implement multiple buck-boost converters in parallel. The buck-boost circuit may this employ redundancy, whereby a failure of one or more of the buck-boost converters does not prevent continued operation of the system. For example, a buck-boost converter may include one or more fuses to prevent irreparable damage to the buck-boost converter in the event of overcurrent conditions or other malfunctions. If a fuse blows, the buck-boost converter no longer operates until the fuse is replaced. However, other buck-boost converters may still be in operation and may permit the system to continue functioning. A controller (e.g. software executing on a processor or hardware) may cause the other buck-boost converters to produce additional current through control inputs to the buck-boost converters. In an embodiment, the controller may monitor a peak voltage over the inductor in the buck-boost converters to detect a failure in a converter.

In an embodiment, the buck-boost circuit is designed to withstand inrush currents that are significantly larger than the currents that the buck-boost circuit is designed to handle during normal operation. The inrush currents may occur during power up of the system, during insertion of the buck-boost circuit into a system that is in operation, etc. In an embodiment, the buck-boost circuit implements surge current supply circuit that provides the surge current. An exemplary implementation of the surge current supply circuit may include one or more polyfuses applied in parallel to bypass the surge current around the buck-boost circuit. The polyfuses may bypass the large surge currents, and may heat and eventually open as the surge current is dissipated. The buck-boost circuit may subsequently begin normal operation.

In an embodiment, the buck-boost circuit described herein achieves high efficiency in the conversion. The efficiency may be measure as the amount of power on the output for a given amount of source power. For example, efficiencies in the range of about 94-95% may be achieved in boost mode. Efficiencies in the range of about 96-97% in buck mode may be achieved.

BRIEF DESCRIPTION OF THE DRAWINGS

Advantages of the present invention will become apparent to those skilled in the art with the benefit of the following detailed description of embodiments and upon reference to the accompanying drawings in which.

Figure 1:
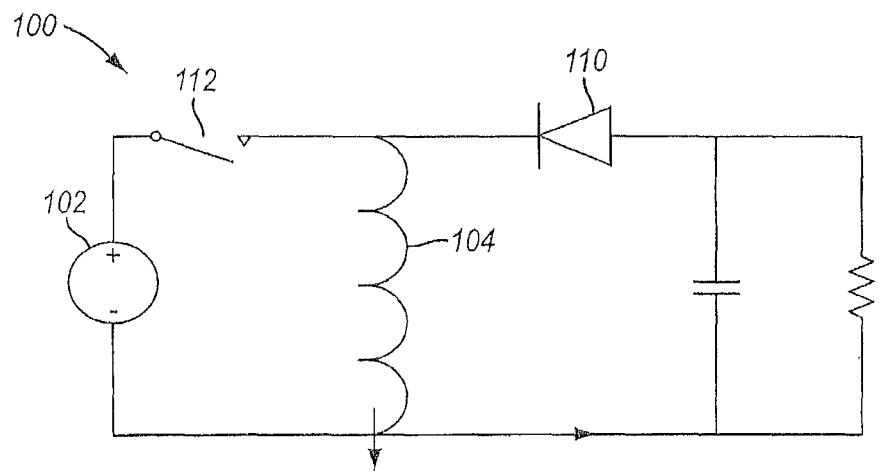
FIG. 1 is a diagram depicting a conventional buck-boost converter.

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

It is to be understood the present invention is not limited to particular devices or methods systems, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise.

Reference will now be made in detail to embodiments disclosed in the accompanying drawings. Wherever possible, the same reference numbers will be used throughout the drawings to refer to the same or like parts.

One embodiment of the buck-boost circuit is described below in the context of a flow cell battery system. However, buck-boost circuits similar to those described herein may be used in numerous other applications and are not limited to the use described below. Controller circuitry such as the processor-based design illustrated in some of the figures herein or a hardware-based design may be used with various embodiments of the buck-boost circuit in such other applications. An overview of the flow cell battery system is discussed next.

Flow Cell Battery and System Overview

Figure 2:
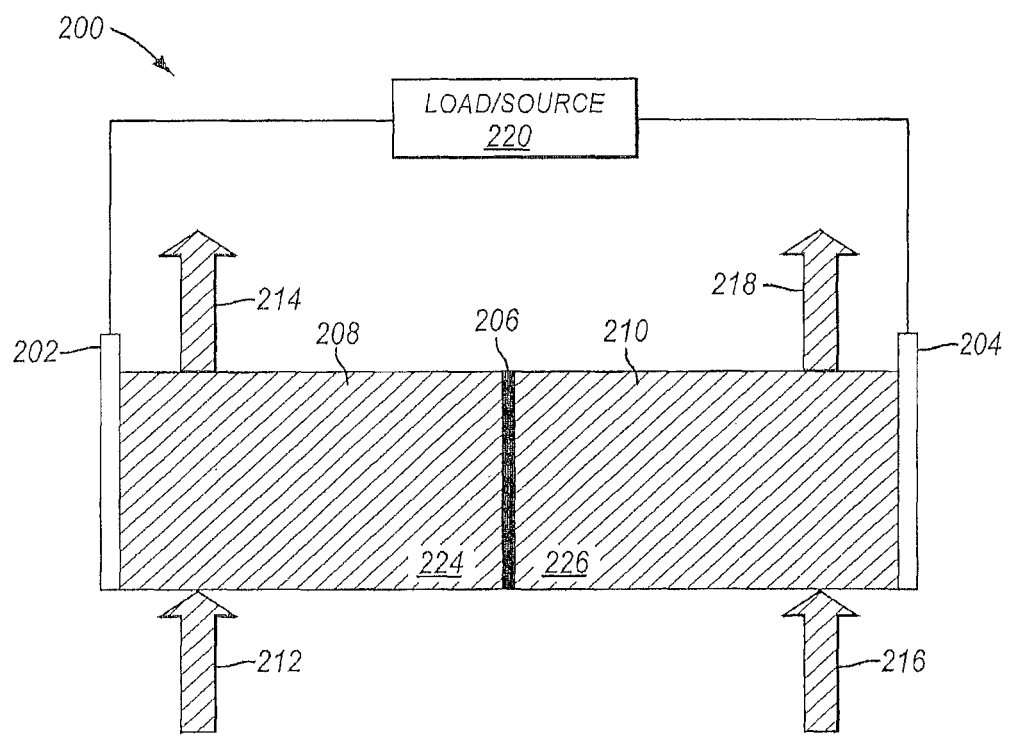
FIG. 2 is a diagram depicting a redox flow cell of a redox flow cell battery.

FIG. 2 illustrates a redox flow cell 200 of a redox flow cell battery according to some of the embodiments described herein. As shown, cell 200 includes two half-cells 208 and 210 separated by a membrane 206. An electrolyte 224 is flowed through half-cell 208 and an electrolyte 226 is flowed through half-cell 210. Half-cells 208 and 210 include electrodes 202 and 204 respectively, in contact with electrolytes 224 and 226, respectively, such that an anodic reaction occurs at the surface of one of electrodes 202 or 204 and a cathodic reaction occurs at the surface of the other one of electrodes 202 or 204. In some embodiments, multiple redox flow cells 200 can be electrically coupled (e.g., stacked) either in series to achieve higher voltage or in parallel in order to achieve higher current. As shown in FIG. 2, electrodes 202 and 204 are coupled across load/source 220, through which electrolytes 224 and 226 are either charged or discharged. The operation of a flow cell and the composition of a membrane is further described in U.S. patent application Ser. No. 12/217,059, entitled "Redox Flow Cell," filed on Jul. 1, 2008 and issued as U.S. Pat. No. 7,927,731 on Apr. 19, 2011, which is incorporated herein by reference. Construction of a flow cell stack is described in U.S. patent application Ser. No. 12/577,134, entitled "Common Module Stack Component Design" filed on Oct. 9, 2009 and published as U.S. Patent Application Publication No. 2010/0136455, which is incorporated herein by reference.

When filled with electrolyte, one half-cell (e.g., 208 or 210) of redox flow cell 200 contains anolyte 226 and the other half-cell contains catholyte 224, the anolyte and catholyte being collectively referred to as electrolytes. Reactant electrolytes may be stored in separate tanks and dispensed into the cells 208 and 210 via conduits coupled to cell inlet/outlet (I/O) ports 212, 214 and 216, 218 respectively, often using an external pumping system. Therefore, electrolyte 224 flows into half-cell 208 through inlet port 212 and out through outlet port 214 while electrolyte 226 flows into half-cell 210 through inlet port 216 and out of half-cell 210 through outlet port 218.

At least one electrode 202 and 204 in each half-cell 208 and 210 provides a surface on which the redox reaction takes place and from which charge is transferred. Suitable materials for preparing electrodes 202 and 204 generally include those known to persons of ordinary skill in the art. Examples of electrodes 202 and 204 are also described in U.S. patent application Ser. No. 12/576,235, filed on Oct. 8, 2009 and issued as U.S. Pat. No. 8,236,463 on Aug. 7, 2012, which is incorporated herein by reference. Redox flow cell 200 operates by changing the oxidation state of its constituents during charging or discharging. The two half-cells 208 and 210 are connected in series by the conductive electrolytes, one for anodic reaction and the other for cathodic reaction. In operation (i.e., charge or discharge), electrolytes 226 and 224 (i.e., anolyte or catholyte) are flowed through half-cells 208 and 210 through I/O ports 212, 214 and 216, 218 respectively as the redox reaction takes place. Power is provided to a load 220 or received from power source 220, depending on if the flow cell battery is in discharging or charging mode, respectively.

Figure 3:
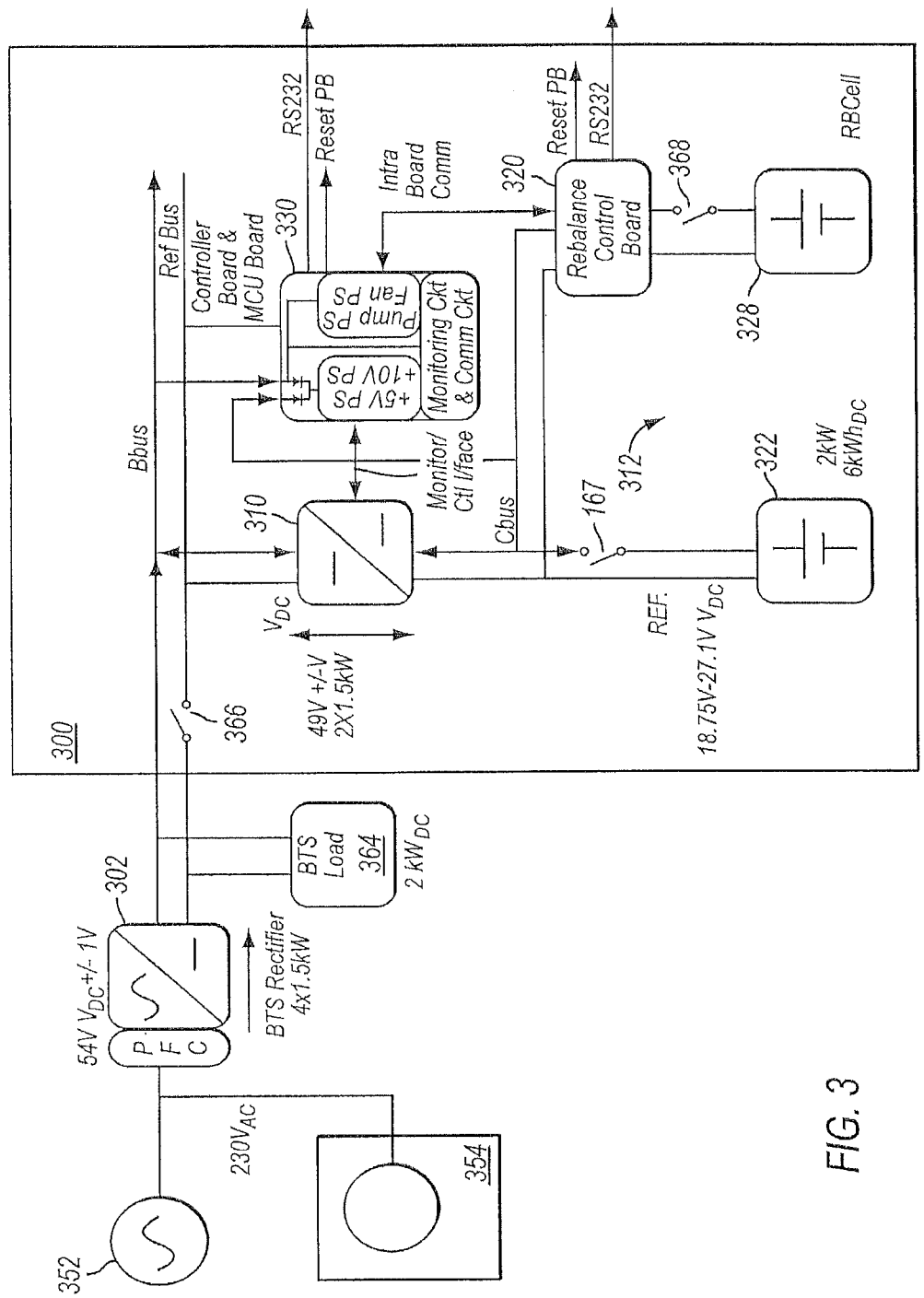
FIG. 3 is a diagram illustrating a particular example of a flow cell battery system according to some embodiments.

FIG. 3 illustrates a flow cell battery system 300 in which a flow cell battery 312 can operate according to some embodiments. As shown in FIG. 3, power is received from several sources, including an external power line 352 or a generator 354 (e.g., a diesel or gas powered generator). In general, external power can be received from any source, including a power grid or dedicated generator 352 such as a solar, tidal, wind, or other form of generator 352. AC power is received in a rectifier 302, which is coupled to provide DC power to load 364. DC power is provided to flow cell battery system 300 from rectifier 302 when AC power is supplied to rectifier 302. In the embodiment shown in FIG. 3, DC power supplied to flow cell battery system 300, and to load 364, is supplied between a reference bus and a Bbus.

As shown in FIG. 3, flow cell battery system 300 includes a flow cell battery 312, which includes a flow cell stack 322 and a rebalance cell 328. Flow cell stack 322 provides or receives DC power through a Cbus to a buck-boost circuit 310. An example of buck-boost circuit 310 is described in more detail below. During charging of flow cell battery 312 from the external source, buck-boost circuit 310 provides charging current from rectifier 302 to flow cell stack 322 in order to charge flow cell battery system 300. During discharge, buck-boost circuit 310 provides power across load 364 when no power is provided by rectifier 302. Power is supplied or received by buck-boost circuit 310 when switches 366 are closed.

Specifically, in an embodiment, the buck-boost circuit 310 may operate in buck mode (or may be "bucking") during charging of the flow cell battery 312 and may operate in boost mode (or may be "boosting") during discharge of the flow cell battery 312 to the load. Thus, the buck-boost circuit 310 is bi-directional in this embodiment.

Rebalance cell 328 is coupled to flow cell stack 322 to rebalance the electrolytes during operation. Rebalance cell 328 is controlled by a rebalance control board 320. Some embodiments of rebalance cell 328 and rebalance control board 320 are further described in U.S. patent application Ser. No. 12/790,573, filed May 28, 2010, entitled "Redox Flow Cell Rebalancing" and published as U.S. Patent Application Publication No. 2011/0086247, filed concurrently herewith, which claims priority to U.S. Provisional Patent Application No. 61/182,099, entitled "Flow Cell Rebalancing" and filed May 28, 2009, both of which are incorporated herein by reference. As shown in FIG. 3 when switch 368 is closed, power can be supplied to rebalance cell 328 by rebalance control board 320.

Monitor and control circuit 330 monitors and controls operation of flow cell battery system 300. As shown in FIG. 3, monitor and control circuit 330 is coupled to rebalance control board 320 and the buck-boost circuit 310, and monitors the Bbus and the Cbus. Monitor and control circuit 330 is also coupled to control the flow of electrolytes in flow cell stack 322. Specifically, with regard to the buck-boost circuit 310, the monitor and control circuit 330 may monitor the circuit 310 and may provide control to the circuit 310. The monitor and control circuit 330 may, in an embodiment, include one or more processors. At least one of the processors may execute code that performs the monitoring and control of the circuit 310. In other embodiment, the monitor and control circuit 330 may include hardware that performs the monitoring and control.

Figure 4:
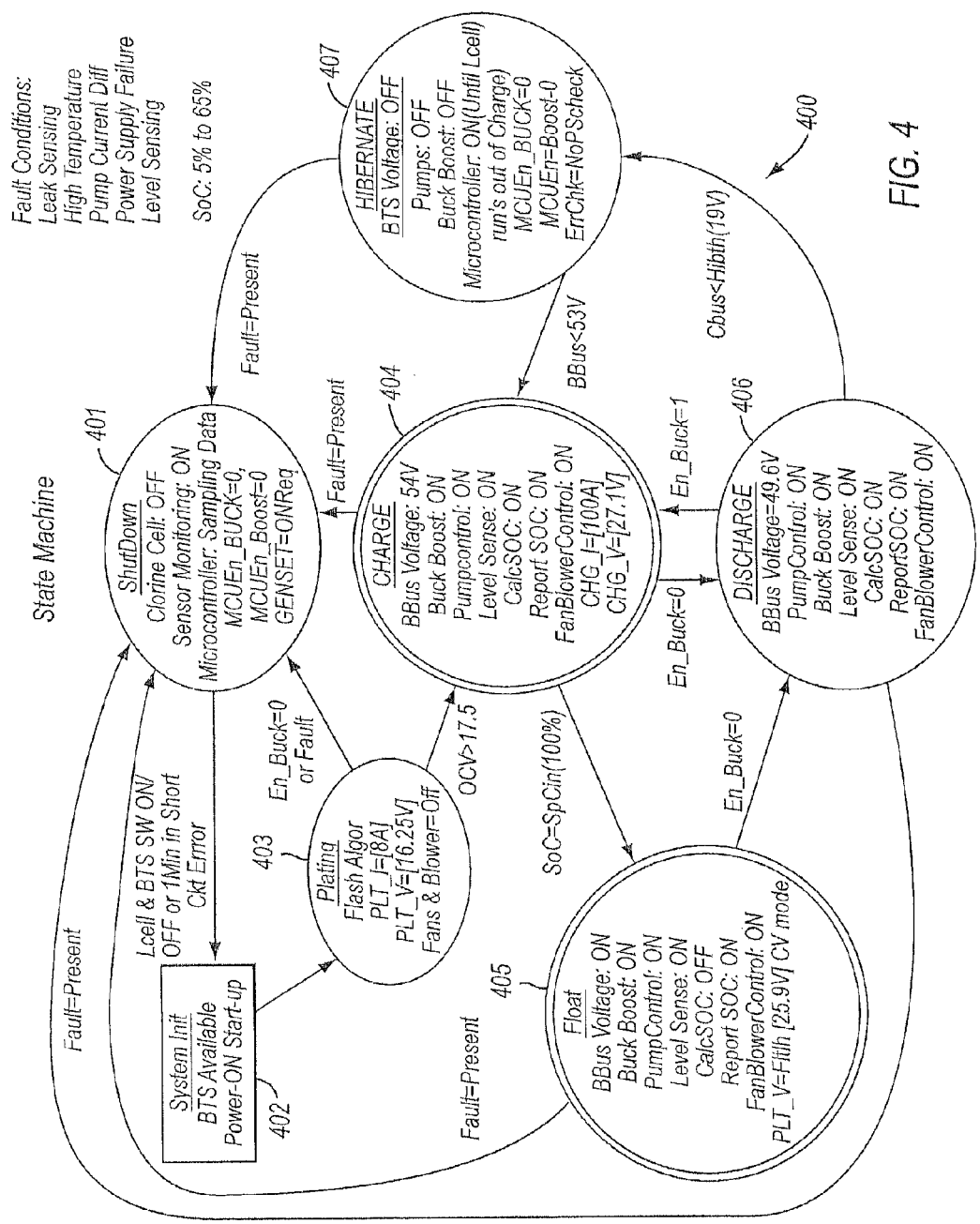
FIG. 4 is a diagram of one embodiment of a state function map for operation by a controller system.

FIG. 4 illustrates a state diagram that can be executed on monitor and control circuit 330 for operation of flow cell battery system 300. As shown in FIG. 4, monitor and control circuit 330 starts in shutdown state 401. In state 401, all pumps are off and all buck-boosts are off. Sensor monitoring is on and monitor and control circuit 330 may be sampling data. Further, a genset request may be on. Essentially, flow cell battery system 300 is off. Switches 366 and 368, as shown in FIG. 3, may be open, isolating flow cell battery system 300 from load 364, as shown in FIG. 3.

Monitor and control circuit 330 transitions to a system initialization state 402 when a main switch, switch 366, is turned on or a short condition is experienced for a specified period of time. In some embodiments, switch 368 is closed along with switch 366. In initialization state 402, load 364 is available and flow cell battery system 300 is powered on. Further, software parameters are initialized. Once initialization step 402 is complete, monitor and control circuit 330 transitions to plating step 403.

During plating state 403, power is applied across the electrodes of flow stack 322 (shown in FIG. 3) in order to provide plating of the electrodes using a plating metal added to the electrolytes for the electrodes in flow stack 322 (e.g., bismuth metal). In some embodiments, a small current at a nominal voltage is provided. When the current drops below a current threshold value or the voltage increases above a voltage threshold value, plating is completed.

For example, in some embodiments the plating voltage is set at 16.25 V with a current of 8 amps. Plating is completed if the current drops below 4 amps and the voltage increases about 16.75 volts. Once plating is completed, monitor and control circuit 330 transitions to charging state 404.

In some embodiments, especially when a new flow cell battery 312 is placed in service, a small amount of plating metal is added to the electrolytes and is plated onto the electrodes of flow cell stack 322 during plating state 403. When flow cell stack 322 has been plated, in some embodiments plating state 403 can be bypassed. In some embodiments, plating state 403 operates on each transition from initialization state 402. Plating is done at low voltage and low current. In order that plating state 403 completes, even with systems that have already been plated, monitor and control circuit 330 is capable of detecting completion in order to transition to charging state 404.

Several states of state machine 400 transition to shutdown state 401 upon detection of a fault. Fault conditions include, for example, detection of a leak, detection of a high temperature situation, detection of a pump problem, detection of a power supply failure for powering electronics, and detection of a low electrolyte level. Other fault conditions may also be detected. Monitor and control circuit 330 transitions from plating state 403 to shutdown state 401 upon detection of a fault or if a buck state in buck-boost circuit 310 is not enabled.

In charging state 404, flow cell battery 312 is charged. Generally, charging involves supplying a current to the flow cell battery 312 while flowing electrolytes through flow cell stack 322 in order to restore the charged chemical state of the electrolytes. Charging electrolytes is generally discussed in U.S. application Ser. No. 12/074,110, filed on Feb. 28, 2008 and issued as U.S. Pat. No. 8,587,150 on Nov. 19, 2013, which is incorporated herein by reference.

In the charge state 404, power is supplied from either generator 354 or power source 352 through rectifier 302. In some embodiments, voltage on the Bbus when rectifier 302 is active can be about 54 V. Buck-boost circuit 310 is in buck mode and provides power to C-bus, which is utilized to charge flow cell stack 322. Pump controls are active to control pumps for the flow cell battery, the level sensors are active to monitor electrolyte levels in tanks for the battery, state-of-charge monitoring is active, and thermal control is on.

Further, the state of charge ("SOC") of the electrolytes are monitored and reported during the charging process. Descriptions of measurements of the state of charge is provided in U.S. patent application Ser. No. 11/674,101, filed on Feb. 12, 2007 and issued as U.S. Pat. No. 7,855,005 on Dec. 21, 2010, which is herein incorporated by reference. During charging, thermal monitoring and control is accomplished, for example as U.S. patent application Ser. No. 12/577,127, entitled "Thermal Control of a Flow Cell Battery" filed on Oct. 9, 2009 and issued as U.S. Pat. No. 7,919,204 on Apr. 5, 2011, which is incorporated herein by reference.

In some embodiments, a particular voltage and current are applied to the electrodes in order to charge the electrolytes. Applying power to the electrodes while electrolytes flow through the flow cell battery brings at least a portion of the electrolytes from a discharged chemical state to a charged chemical state. In some embodiments, charging may stop at a predetermined charged set point. For example, charging may be stopped when the SOC reaches substantially 100%. In other embodiments, the predetermined charged set point is reached when an SOC is greater than 80%, greater than 85%, greater than 90%, greater than 95%, or greater than 99%. If, at that time, power from power source 352 is still available, monitor and control circuit 330 transitions to a float state 405. In some embodiments, for example, charging may occur at a voltage across the electrodes of about 30 volts and a current through flow cell stack 322 of about 100 amps, although more complicated charging algorithms can be employed by monitor and control circuit 330.

If a fault is detected during the charge process that occurs in charge state 404, monitor and control circuit 330 transitions to shutdown state 401 to shut system 300 down. Otherwise, once a SOC of about 100% is achieved, monitor and control circuit 330 transitions to float state 405 if buck is still enabled. Monitor and control circuit 330 transitions from charge state 404 to discharge state 406 if buck-boost 310 switches from buck to boost, indicating that power is no longer being received from rectifier 302.

During float state 405, buck is enabled and provides an output voltage at a particular value. In some embodiments, the value is about 25 Volts. During this state, flow cell battery 312 is standing by and ready to provide power to load 364 should power at rectifier 302 be reduced. During the float state, the pump control is on and pumps may be run to provide a small flow of electrolyte through flow cell stack 322. Further, in some embodiments, power utilized for providing voltage on buck-boost 310 and for running pumps and other system may be supplied by charging rectifier 302 instead of drawing on the charged electrolyte of battery 312. Further, monitoring of the SOC can be turned off. Again, if a fault is detected, monitor and control circuit 330 transitions to shut down state 401.

If power to rectifier 302 fails, then monitor and control circuit 330 transitions from float state 405 to discharge state 406. Monitor and control circuit 330 can also transition from charge state 404 to discharge state 406 before SOC is about 100% if the signal En_Boost indicates that power to rectifier 302 has been interrupted. In discharge state 406, power from flow cell battery 312 is supplied to load 364. In that case, the pumps are activated and controlled, buck-boost circuit 310 is in boost mode, electrolyte levels in the tanks are monitored, and the SOC is monitored and reported. In some embodiments, the Bbus voltage can be held at about 50 V.

Once the SOC drops below a certain value, for example 10%, or available power on the Cbus drops, for example below about 20 V, which indicates that flow cell battery 312 is in a substantially discharged state, then monitor and control circuit 330 can transition from discharge state 406 to a hibernation state 407. If, during discharge, a fault is detected, then monitor and control circuit 330 can transition from discharge state 406 to shutdown state 401. Further, if power, for example from power source 352 or from generator 354, is supplied to rectifier 302 then monitor and control circuit 330 can transition from discharge state 406 back to charge state 404, buck-boost circuit 310 switches from boost mode to buck mode, so that flow cell battery 312 can be recharged.

Monitor and control circuit 330 transitions into hibernate state 407 from discharge state 406 when flow cell battery 312 is reaches a predetermined discharged set point. For example, the flow cell battery system 300 may be transitioned to a hibernation state when the SOC is less than 1%. In other embodiments, the predetermined discharged set point is reached when an SOC is less than 20%, less than 15%, less than 10%, less than 5%, or less than 2%. In hibernate state 407, the pumps are off and buck-boost 310 is turned off. Monitor and control circuit 330 monitors flow cell battery system 300 until the charge on flow cell stack 322 is depleted. Monitor and control circuit 330 can transitioned out of hibernate state 407 if power returns to rectifier 302, in which case monitor and control circuit 330 transitions to charge state 404 to recharge flow cell battery 312. Monitor and control circuit 330 can also transition from hibernate state 407 to shutdown state 401 if a fault condition is detected.

Monitor and control circuit 330 can transition from hibernate state 407 if power appears on the Bbus. In some embodiments, generator 354 may be activated in discharge state 406 if SOC is reduced below a threshold level. In some embodiments, generator 354 may be activated in hibernate state 407.

In handling any fault state that occurs throughout state machine 400, the first fault can be latched for later review and state machine 400 transitions to shutdown state 401. In some cases, multiple cascading fault conditions result from the initial fault condition, so capturing the first fault condition can help a servicer to restart system 300.

Buck-Boost Circuit

The Bbus and the Cbus referred to herein may each be a power bus, or power input/output, to which the buck-boost circuit 310 is coupled. The buck-boost circuit 310 is bi-directional in some embodiments, and thus may supply power (voltage and current) on either power input/output at a given point in time. As described previously, the buck-boost circuit 310 may operate in buck mode to supply power on the Cbus, and may operate in boost mode to supply power on the Bbus. In other embodiments, the buck and boost modes may be reversed. In general, the buck-boost circuit 310 may be configured to operate in buck mode to supply power to one power input/output and in boost mode to supply power to another power input/output.

Figure 5:
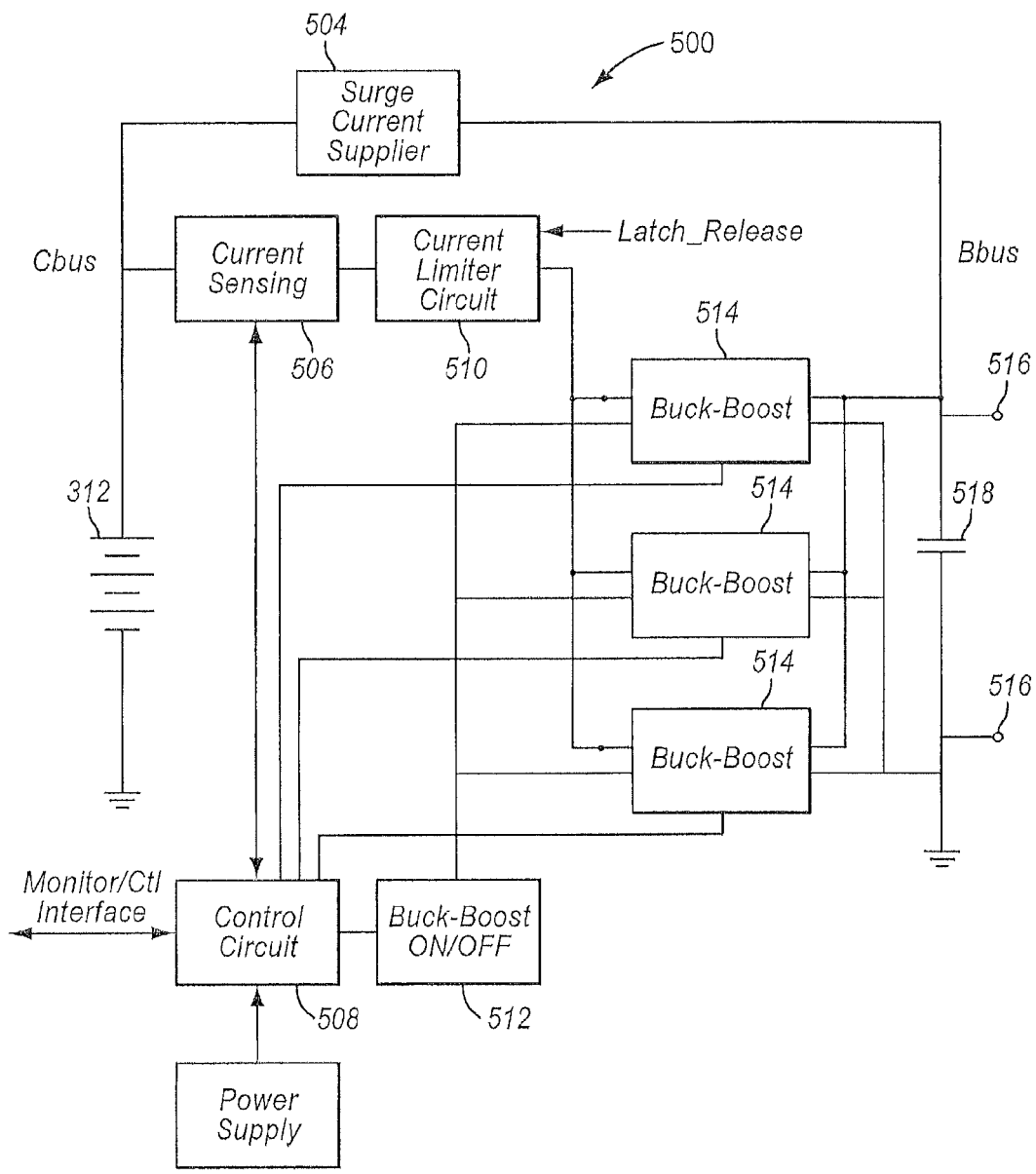
FIG. 5 is a diagram illustrating a buck-boost circuit.

FIG. 5 illustrates an embodiment of a buck-boost circuit 310. As shown in FIG. 5, buck-boost circuit 310 is coupled to the flow cell battery 312 which is coupled to a surge current supplier 504. Surge current supplier 504 may be one or more thermal polyfuses, such as a RUEF 400 thermal fuse manufactured by Tyco Electronics or any equivalent fuse. Battery 312 is also coupled to current sensing circuit 506. Current sensing circuit 506 is coupled to control circuit 508 and current limiter circuit 510. Consistent with some embodiments, control circuit 508 may be coupled to the monitor and control circuit 330 so as to transmit and receive signals from circuit 310 to the monitor and control circuit 330. Specifically, the control circuit 508 may transmit signals to be monitored by the monitor and control circuit 330, and may receive control input signals to control the operation of the circuit 310. Consistent with some embodiments, current limiter circuit 510 may include a hot swap controller which is capable of allowing a circuit to be safely inserted and removed from a live power source, and in this application allows for the momentary high currents involved in switching operations. Current limiter circuit 510 further may include a short circuit detection feature, a current limiting feature, and an overvoltage protection feature. According to some embodiments, current limiter circuit 510 may include an LT 4256-3 Hot Swap™ controller from Linear Technology Corporation. The controller protects the buck-boost circuit 310 during high current events.

In operation, when the initial voltage is applied from input voltage source 312, a current surge is created and flows into surge current supplier 504. Surge current supplier 504, therefore, allows the momentary high current that occurs initially when buck-boost 514 is first switched. As the current flows through surge current supplier 504, surge current supplier 504 heats up until surge current supplier 504 reaches a predetermined temperature. When surge current supplier 504 reaches the predetermined temperature, surge current supplier 504 trips and opens, current is no longer able to flow through surge current supplier 504. Surge current supplier 504 will remain tripped until surge current supplier 504 cools down below the predetermined temperature.

Current limiter circuit 510 and current sensing circuit 506 detect the tripped condition and enable current to flow through current limiter circuit 510. Current limiter circuit 510 allows current flow between battery 312 and buck-boost converters 514. In an embodiment, current limiter circuit 510 has a predetermined current limit, and if the current flowing through current limiter circuit exceeds the predetermined current limit, the current limiter circuit 510 latches off. Current sensing circuit 506 senses the current and control circuit 508 outputs the current to the monitor and control circuit 330. The monitor and control circuit 330 may determine that the current has fallen back below the predetermined limit, and the monitor and control circuit 330 may transmit a latch release signal to current limiter circuit 510, to enable current limiter circuit 510.

The control circuit 508 is further coupled to a buck-boost ON/OFF circuit 512. Buck-boost ON/OFF circuit 512 receives a buck enable signal Buck_EN from monitor and control circuit 330 and a boost enable signal Boost_EN from the monitor and control circuit 330 through control circuit 508, and passes the appropriate signal to the plurality of buck-boost converters 514. However, to prevent one buck-boost converter 514 from bucking while another buck-boost converter 514 is boosting, and to make sure that all of the buck-boost converters 514 are performing the same buck or boost operation, buck-boost ON/OFF circuit 512 receives the buck enable and boost enable signals from an external controller coupled to control circuit 508, and outputs an assertion of at most one of the buck enable or boost enable signals at a time. In effect, buck-boost ON/OFF circuit 512 acts as an exclusive-OR so that buck-boost circuits 514 are either off, in a buck mode, or in a boost mode. In some embodiments, buck-boost ON/OFF 512 receives a Buck_EN signal and a Boost_EN signal and provides corresponding signals to buck-boost converters 514. If Buck_EN is the same as Boost_EN (i.e., both on or both off), then the signals provided to buck-boost converters 514 are off. If Buck_EN is on and Boost_EN is off, then the signals provided to buck-boost converters 514 turn buck mode on. If Buck_EN signal is off and Boost_EN is on, then the signals provided to buck-boost converters 514 turn boost mode on.

As shown in FIG. 5, circuit 310 includes three (3) buck-boost converter circuits 514 coupled in parallel. Buck-boost converters 514 may be coupled to the monitor and control circuit 330 through control circuit 508 in order to measure characteristics of buck-boost converters 514, as is explained further below. The use of three buck-boost converter circuits 514 allows for greater flexibility in controlling output power. The output of all of the buck-boost converter circuits 514 may be combined to produce a power that may be unobtainable with only one buck-boost converter circuit 514.

Moreover, using more than one buck-boost converter circuit 514 also provides redundancy, such that if one buck-boost converter circuit 514 fails, the other circuits can still produce a desired output power. In the illustrated embodiment, three buck-boost converter circuits 514 provide redundancy. In other embodiments, additional or fewer buck-boost converter circuits 514 may be used to provide a desired level of redundancy.

In boost mode, buck-boost converter circuits 514 receive the voltage from current limiter circuit 510, and boost the voltage, depending on the Boost_EN signal received from buck-boost ON/OFF circuit 512. The boosted voltage is output through nodes 516 across capacitor 518, which represents a load circuit. In buck mode, voltage is applied between nodes 516 and the bucked voltage and current is supplied to battery 312. In an embodiment, buck-boost converters 514 all have the same reference current to enable current sharing of buck-boost converters 514. Buck-boost converter circuits 514 are discussed in further detail below.

Consistent with some embodiments, surge current supplier 504, current sensing circuit 506, current limiter 510 and buck-boost converters 514 may be arranged on a single circuit board and coupled to battery 312, control circuit 508, and buck-boost ON/OFF circuit 512. Further consistent with some embodiments, battery 312, control circuit 508, and buck-boost ON/OFF 512 circuits may be coupled to a plurality of circuit boards including surge current supplier 504 current sensing circuit 506, current limiter 510 and buck-boost converters 514. This may allow multiple buck-boost stages for controlling the magnitude of an output voltage. The use of multiple circuit boards each having buck-boost capability allows for further redundancy and extra failsafes in case one circuit board should fail. In some embodiments, circuit 310 produces a pulse-width modulated output having a low frequency and non-synchronous timing.

Figure 6:
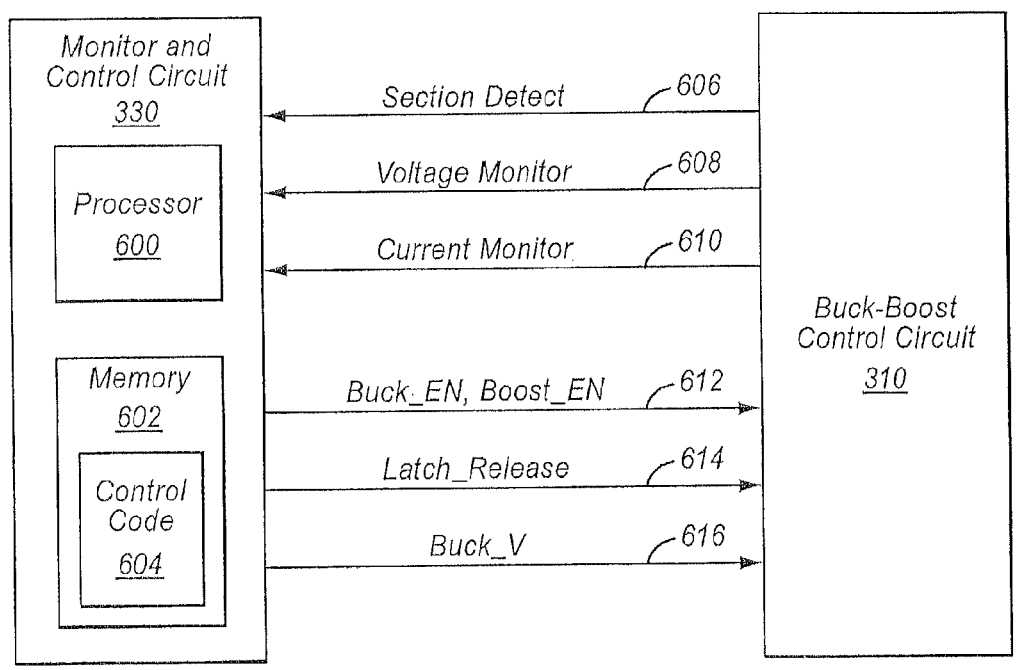
FIG. 6 is a diagram illustrating the external control interface in greater detail for an embodiment.

FIG. 6 is a block diagram illustrating an interface between the buck-boost circuit 310 and the monitor and control circuit 330 in greater detail consistent with some embodiments. The interface may include one or more signals provided by the buck-boost circuit 310 to the monitor and control circuit 330 for monitoring. For example, there may be a section detect signal 606 for each buck-boost converter 514, indicating whether or not that buck-boost converter 514 is operational. There may be one or more voltage monitor signals 608 (e.g. a voltage monitor signal for each of the Bbus and the Cbus). The voltage monitor signal may be the voltage on the corresponding bus, or may be a voltage derived from the voltage on the bus. For example, a resistor divider network may divide down the voltage on the corresponding bus to provide a voltage for monitoring that may be lower than the voltage on the corresponding bus. There may also be one or more current monitor signals 610 (e.g. from the current sensing circuit 506) indicating the current that has been detected in the buck-boost circuit 310. In some embodiments, additional current monitor signals may be provided external to the buck-boost circuit 310, to monitor the current provided on the Bbus and/or Cbus. The external current monitor signals may be desired, e.g., when more than one buck-boost circuit 310 is provided in parallel for additional redundancy and/or more current capacity. It is noted that the signals provided for monitoring in this embodiment are merely exemplary of one embodiment, and other embodiments may provide additional signals, or other signals, as desired in other embodiments.

The monitor and control circuit 330 also provide various control inputs to the buck-boost circuit 310. For example, the monitor and control circuit 330 may provide the Buck_EN and Boost_EN signals previously discussed. The Buck_EN signal may be asserted to indicate buck mode and the Boost_EN signal may be asserted to indicate boost mode. In the state machine 400 shown in FIG. 4, for example, the Boost_EN signal may be asserted in the discharge state 406. The Buck_EN signal may be asserted in the charge state 404, the plating state 403, and the float state 405. Additionally, the monitor and control circuit 330 may control the voltage output in the buck mode (to the flow cell battery 312) differently in different states. For example, in the plating state 403, the monitor and control circuit 330 may control the voltage on the Cbus to be closer to zero than the charge state 404 and the float state 405. A voltage on the order of 16.25 volts and a current of about 8 amps may be desired, as mentioned above. The voltage provided on the Cbus may be adjusted using the feedback adjust control voltage (Buck_V 616 in FIG. 6). The Buck_V voltage may change the feedback voltage on from the Cbus provided to the buck circuitry, which may change the voltage output by the buck circuitry 616 correspondingly. Additionally, the latch_release signal to the current limiter circuit may be provided (reference numeral 614) by the monitor and control circuit 330.

In the embodiment shown, the monitor and control circuit 330 may include a processor 600 configured to execute control code 604 stored in a memory 602 to which the processor 600 is coupled. The control code 604 may, in general, monitor samples of the output signals captured by hardware within the monitor and control circuit 330 from the buck-boost circuit 310 (and potentially other circuitry in the flow cell battery system 300) and may generate the control inputs to the buck-boost circuit 310 (and potentially other circuitry in the flow cell battery system 300). Any control code 604 may be implemented in various embodiments. In one embodiment, the control code 604 may implement the state machine 400 shown in FIG. 4. As mentioned previously, the monitor and control circuit 330 may also implement control of the buck-boost circuit 310 in hardware.

The memory 602 may be one embodiment of a processor-accessible storage medium configured to store instructions to be executed by a processor. Generally speaking, a processor-accessible storage medium may include any storage media accessible by a processor during use to provide instructions and/or data to the processor. For example, a processor accessible storage medium may include storage media such as magnetic or optical media, e.g., disk (fixed or removable), tape, CD-ROM, or DVD-ROM, CD-R, CD-RW, DVD-R, DVD-RW, or Blu-Ray. Storage media may further include volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media may include storage media accessible via a communication medium such as a network and/or a wireless link.

Figure 7:
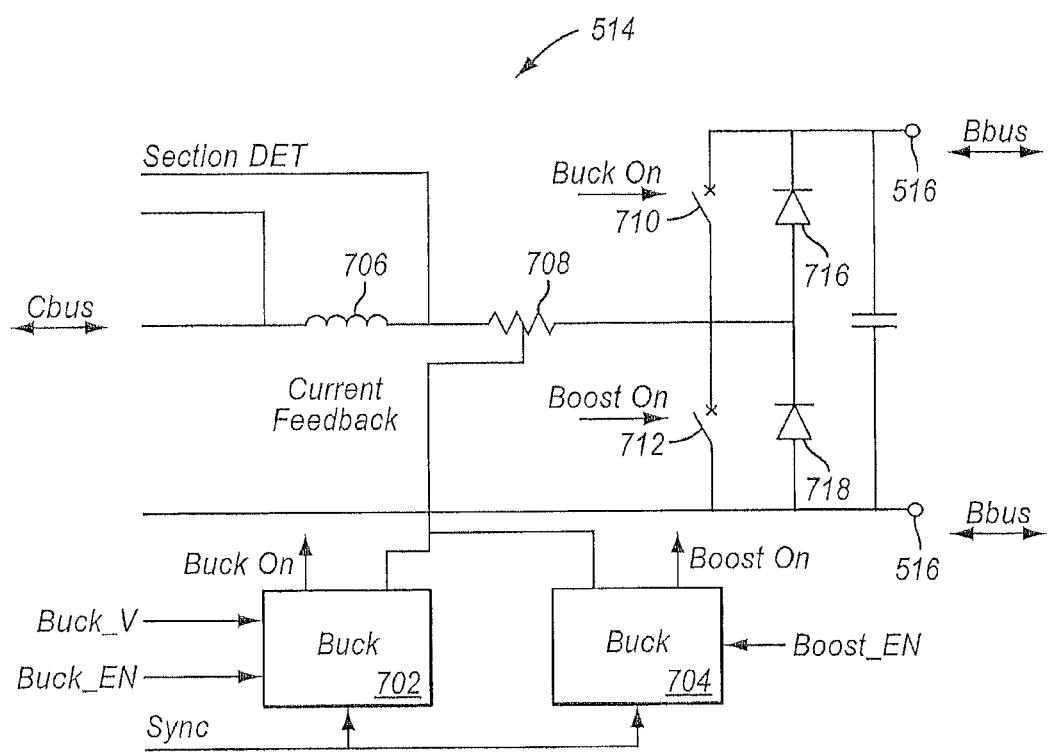
FIG. 7 is a diagram illustrating a buck-boost converter.
Figure 8A:
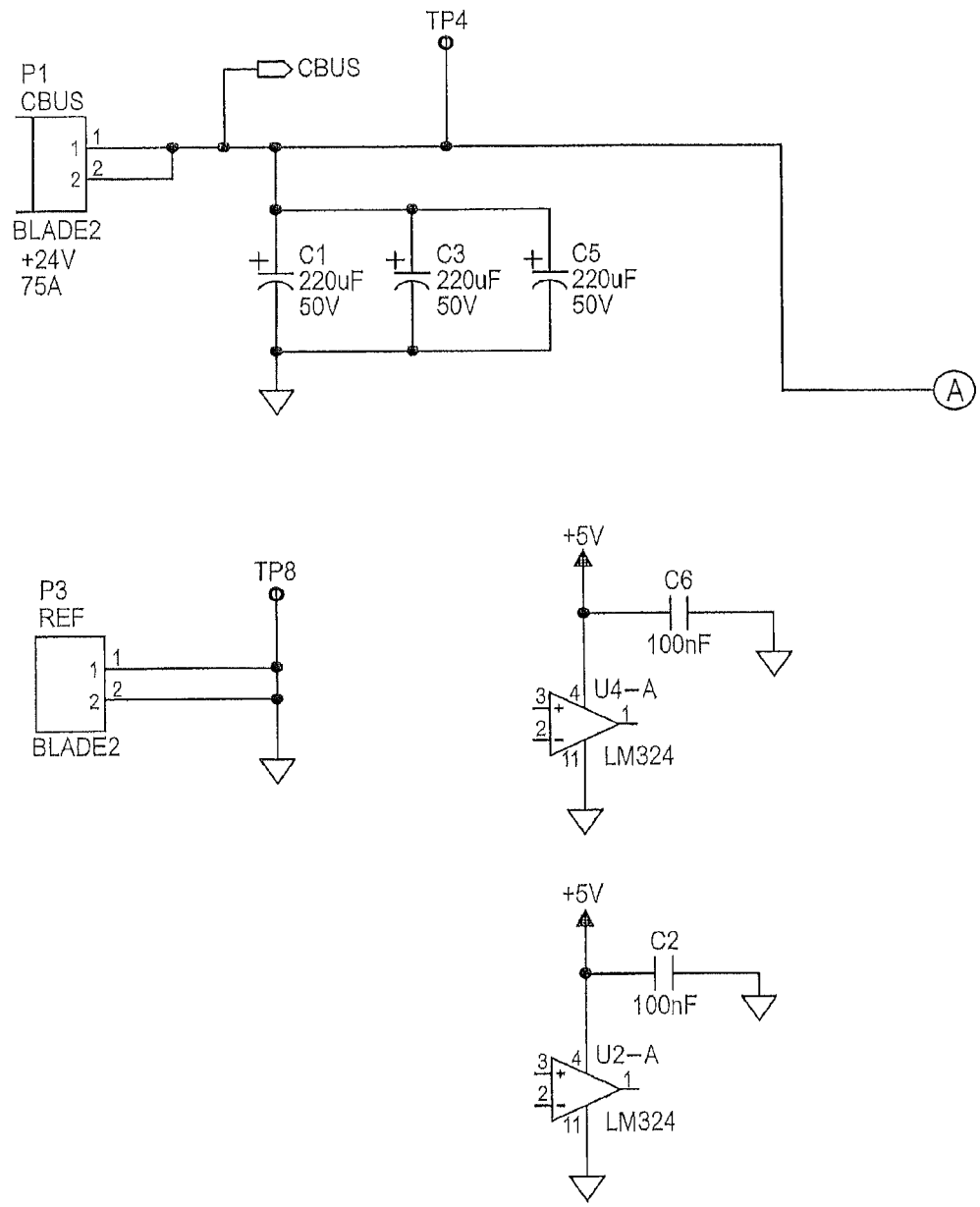
FIGS. 8A-8G, 9A-9I, and 10A-10F are a circuit diagram illustrating one embodiment of the buck-boost circuit of FIG. 5 and the buck-boost converter of FIG. 7 in greater detail.
Figure 8B:
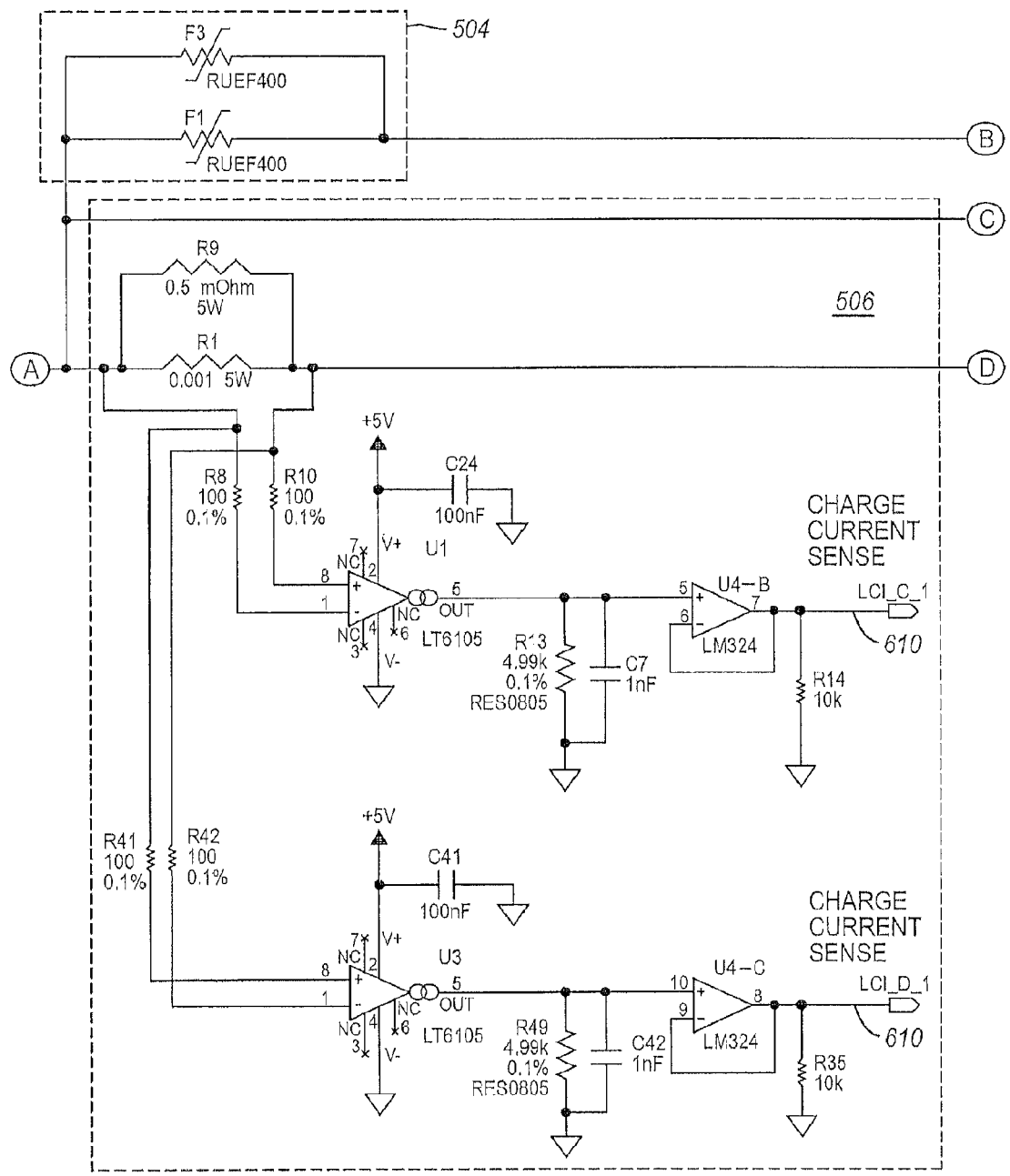
Figure 8C:
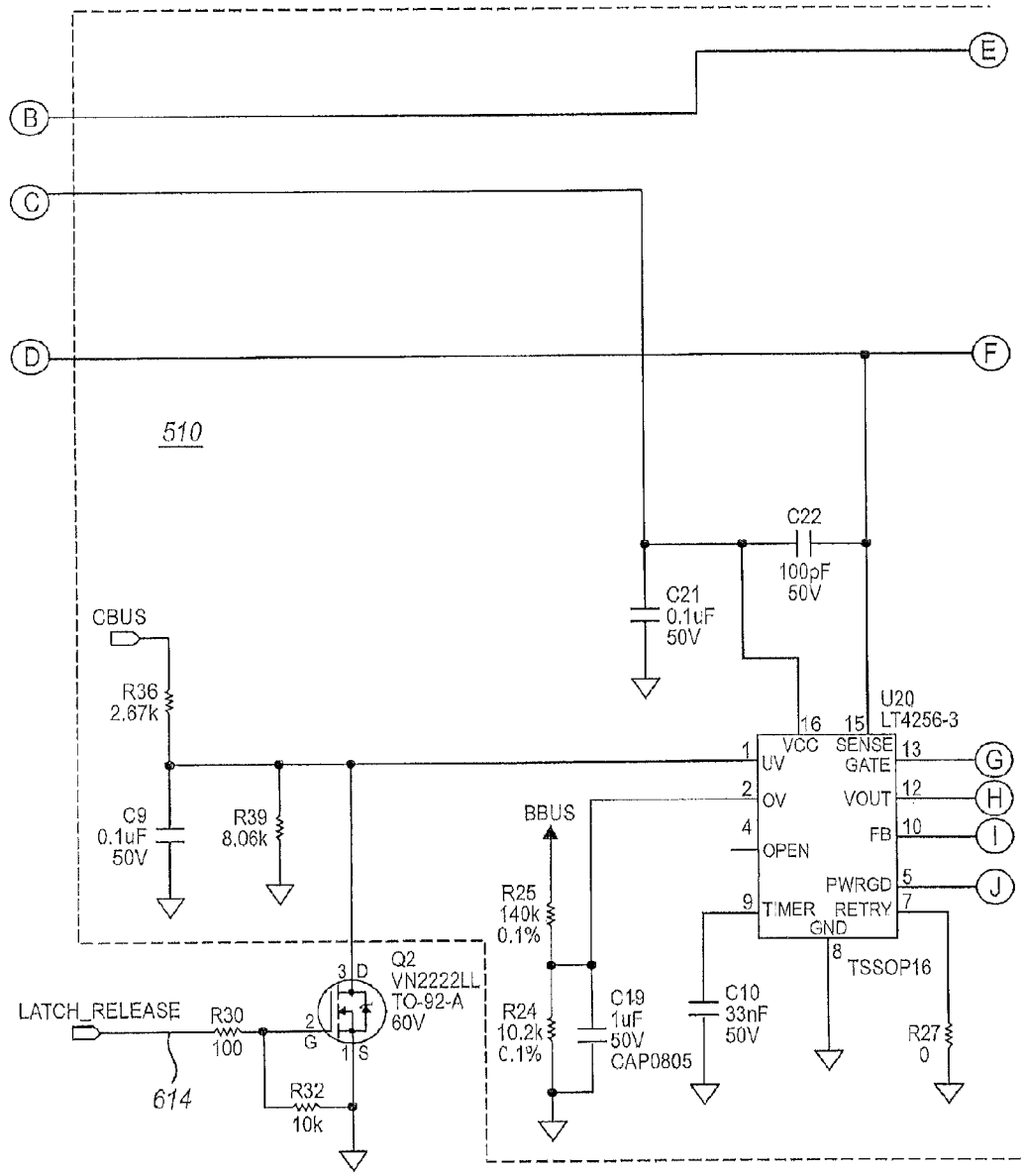
Figure 8D:
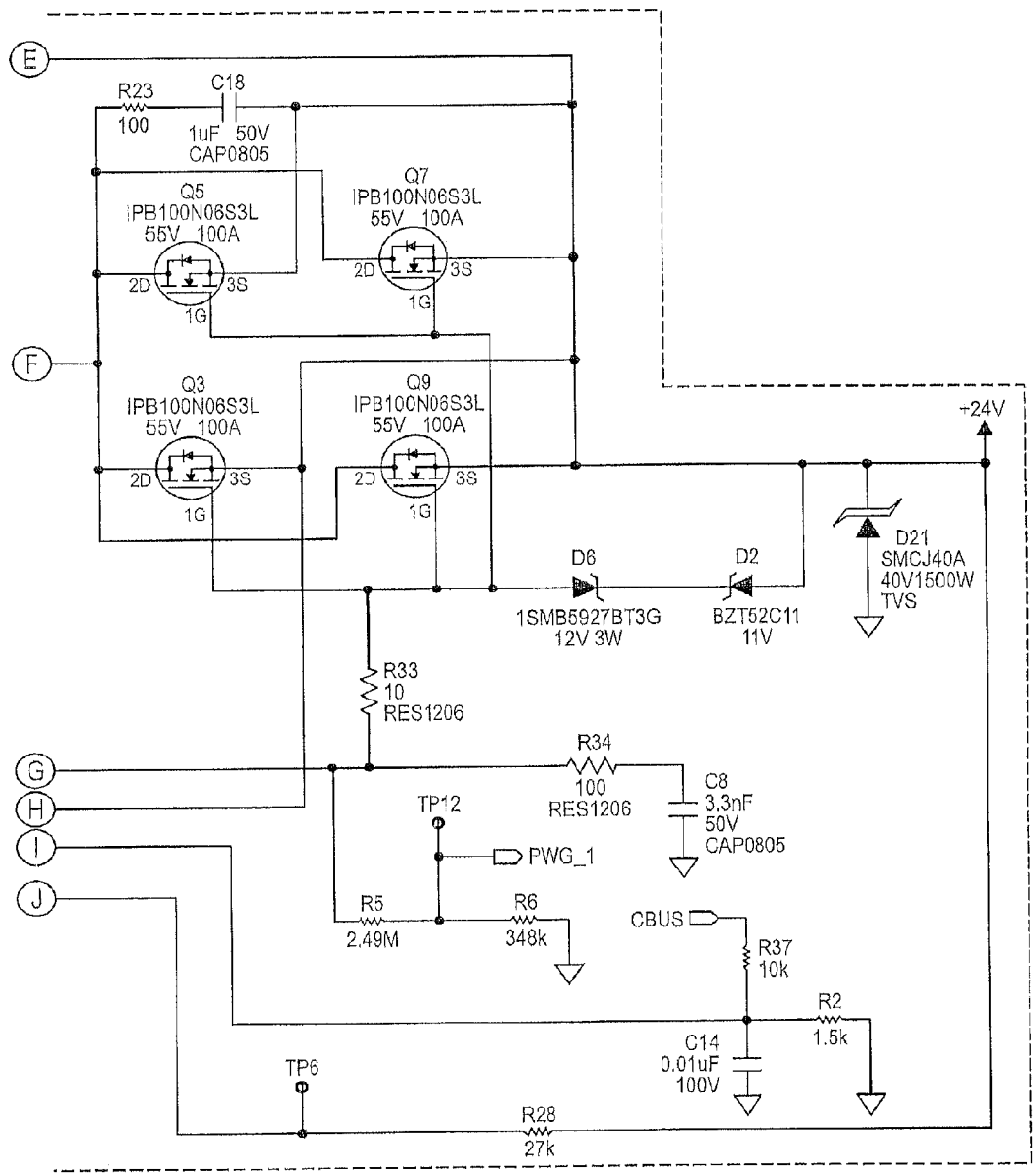
Figure 8E:
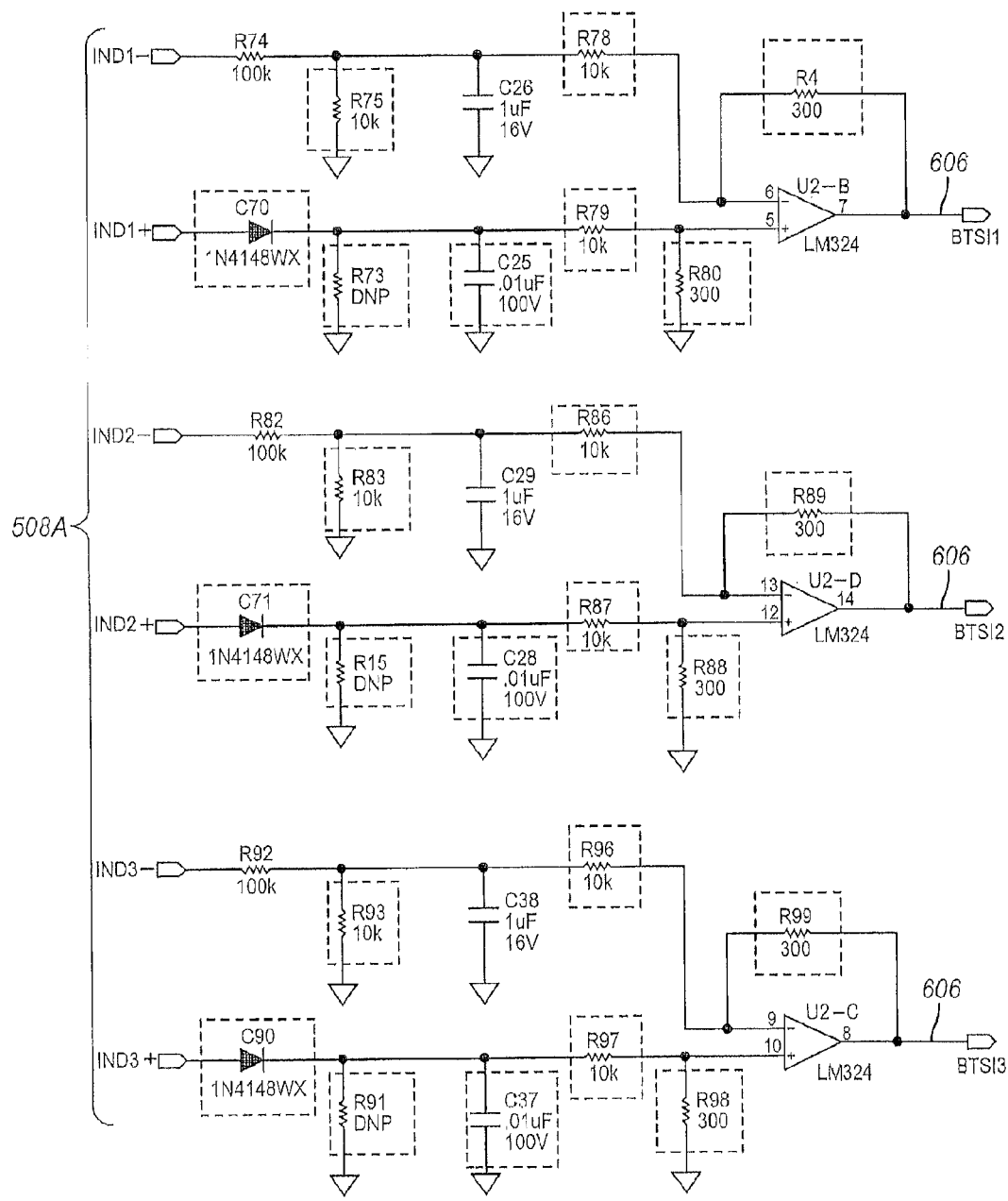
Figure 8F:
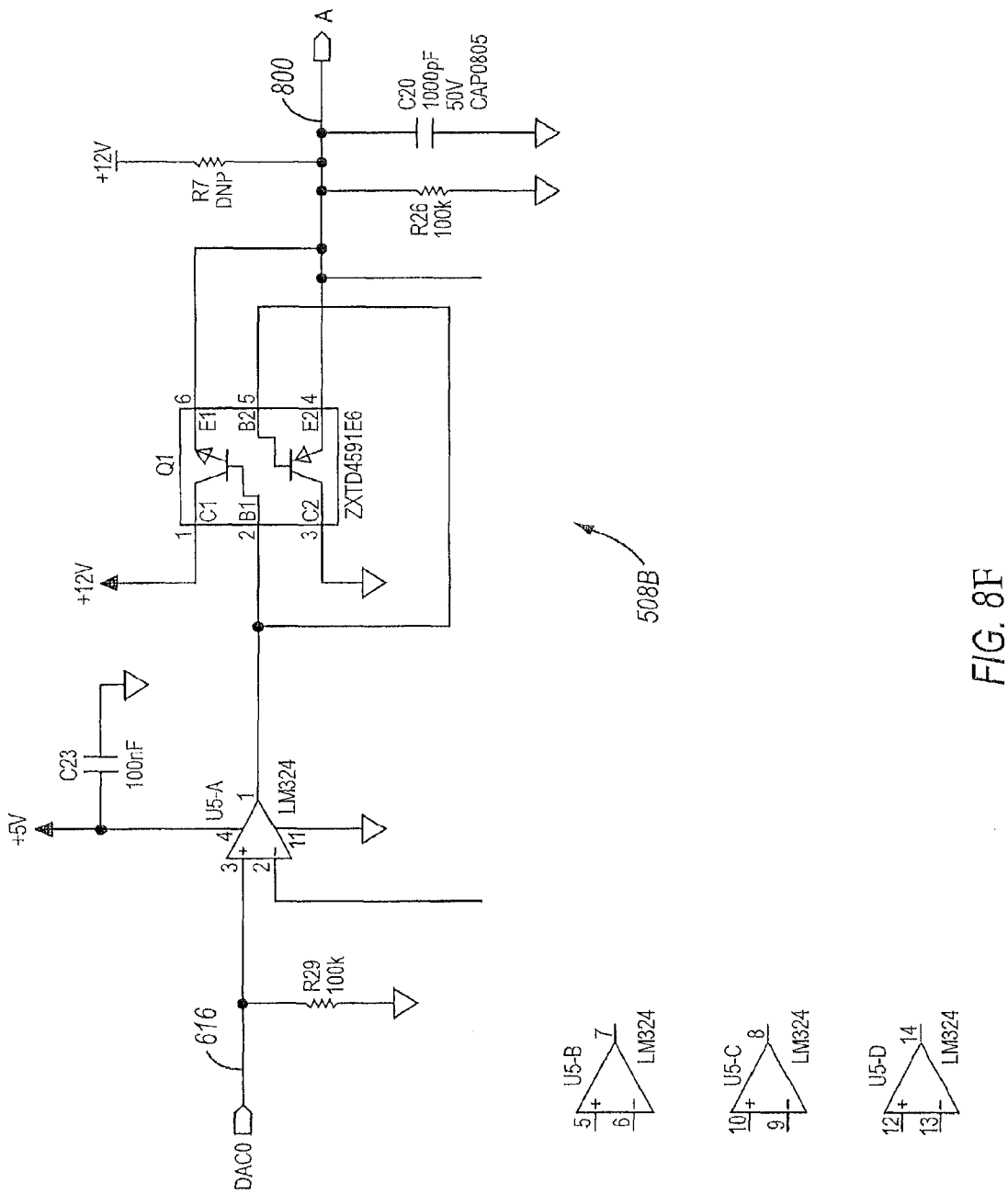
Figure 8G:
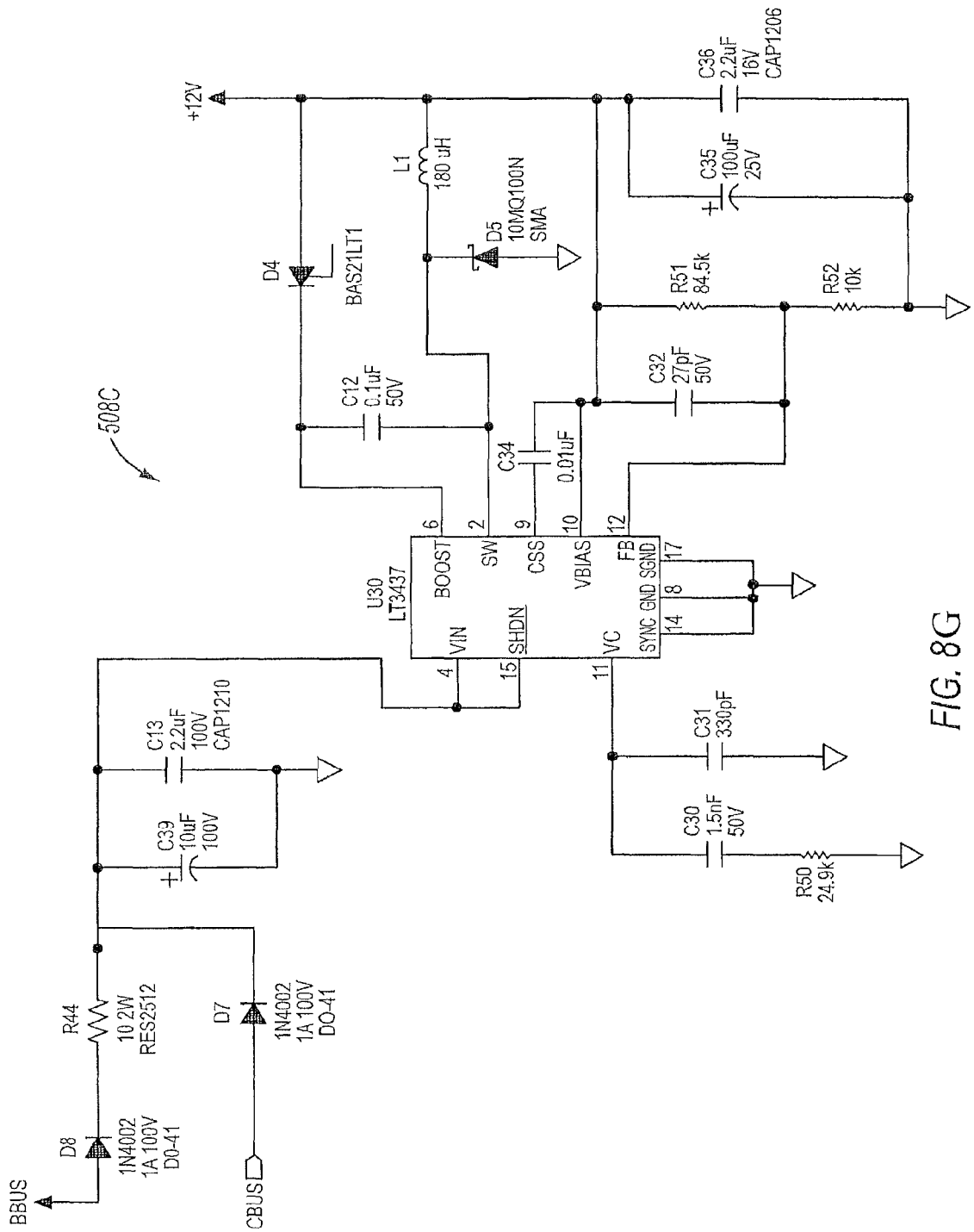
Figure 9A:
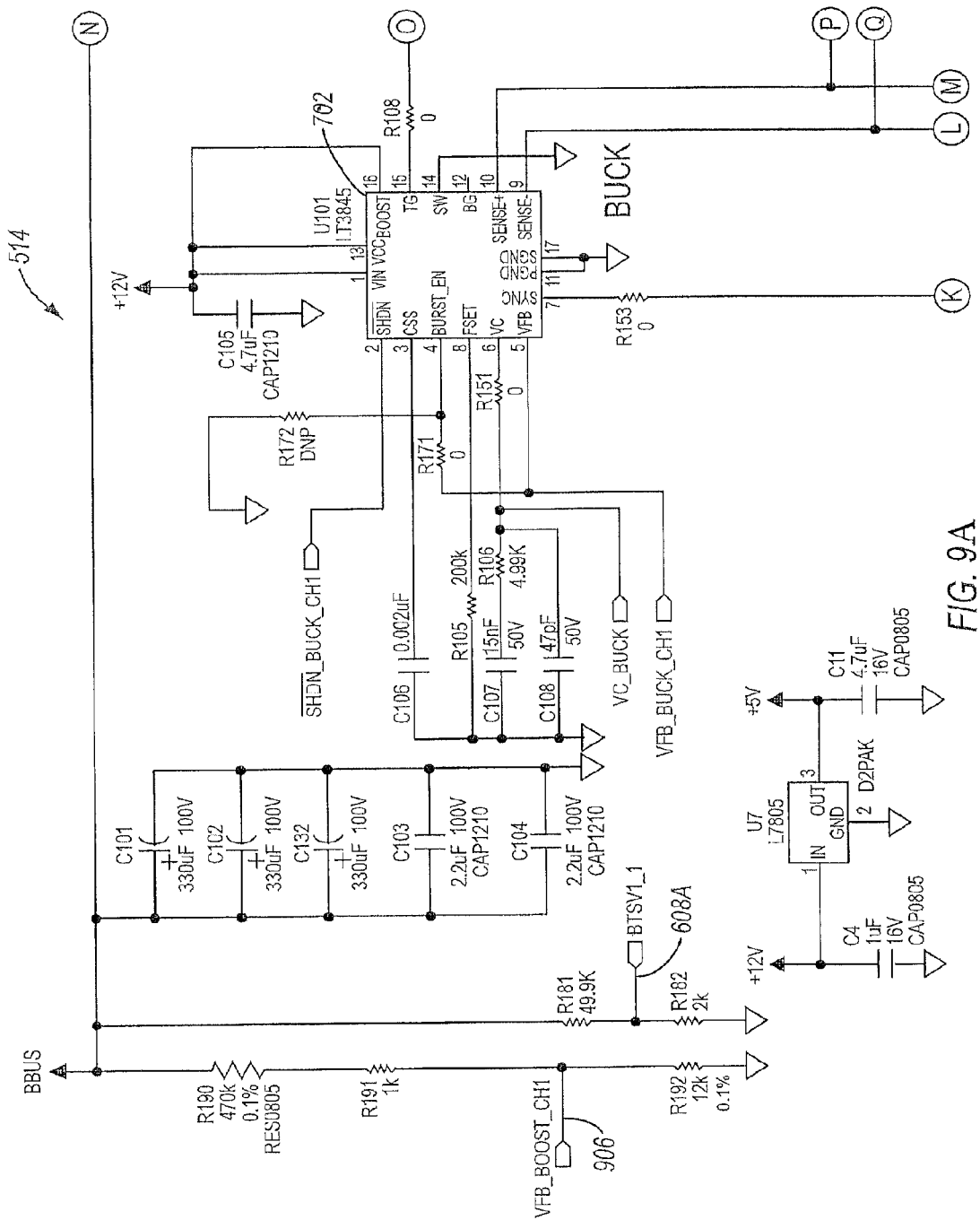
Figure 9B:
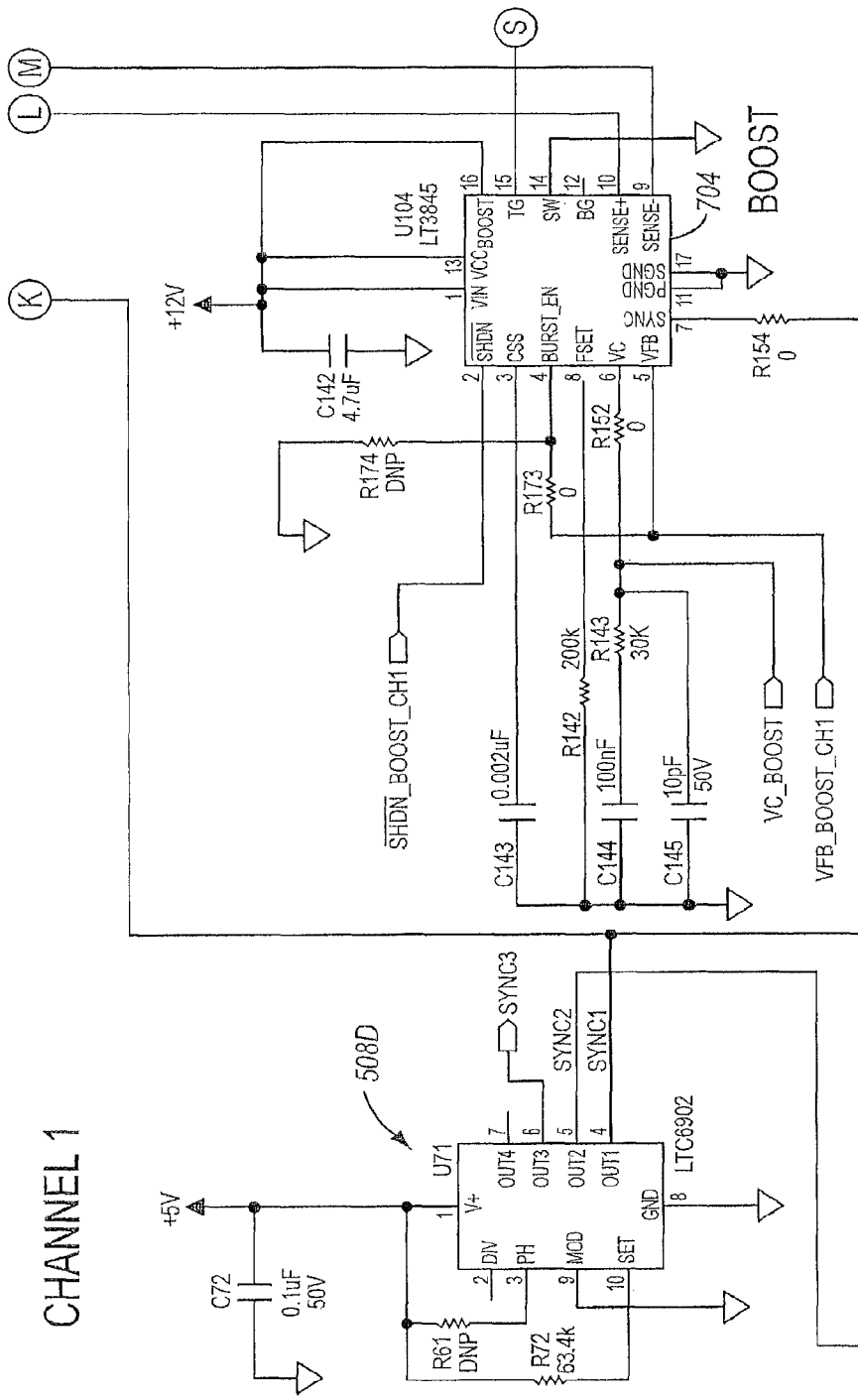
Figure 9C:
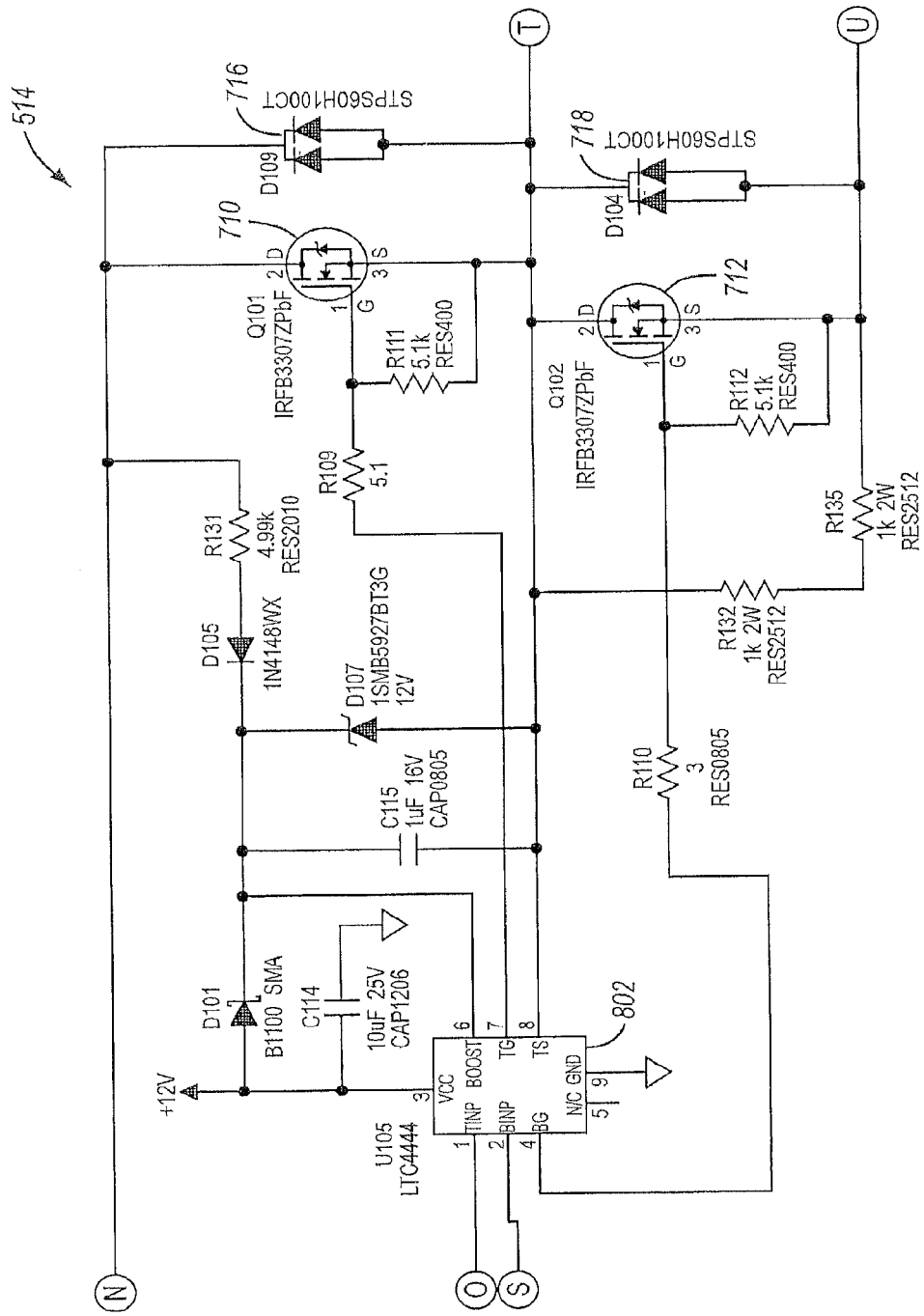
Figure 9D:
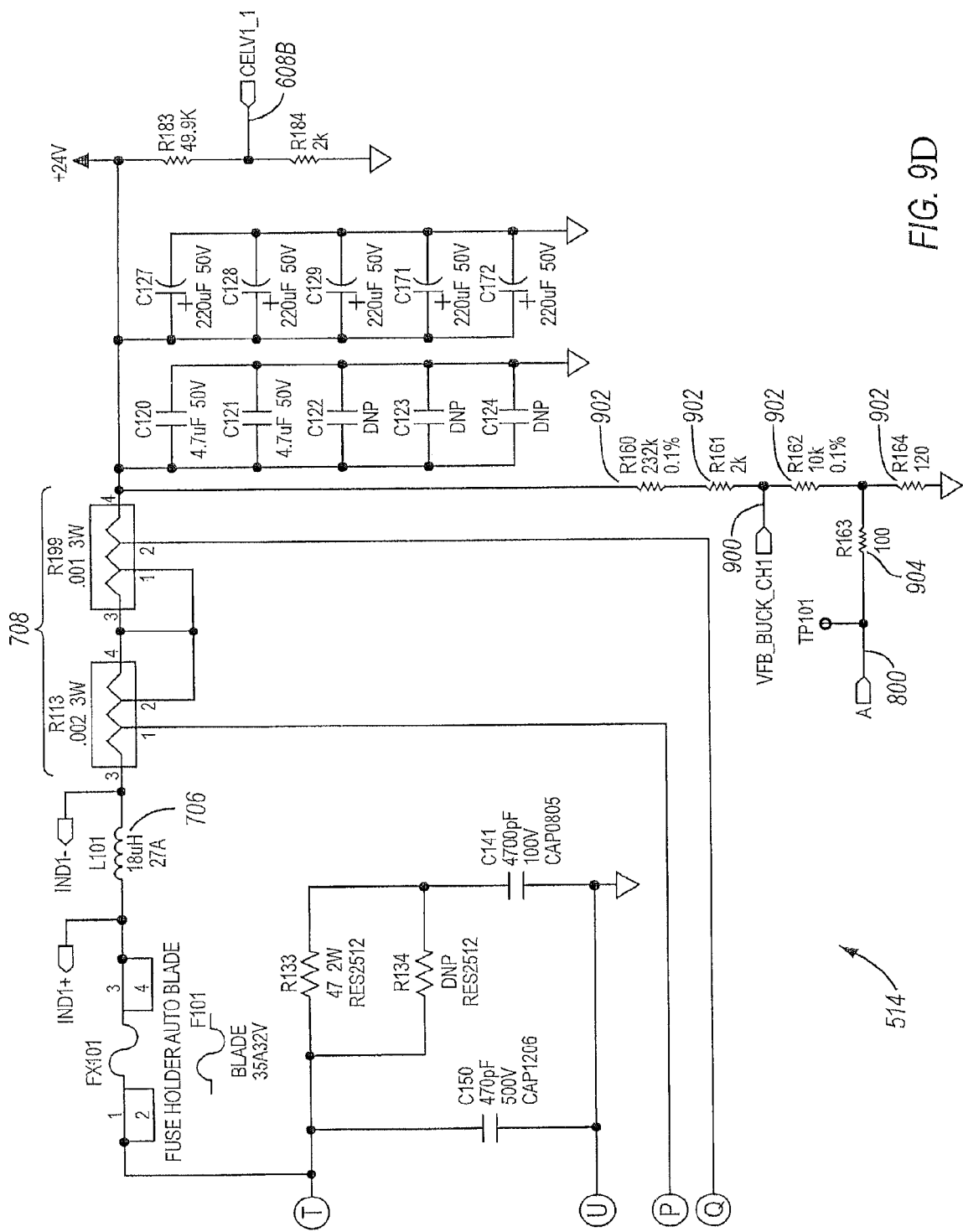
Figure 9E:
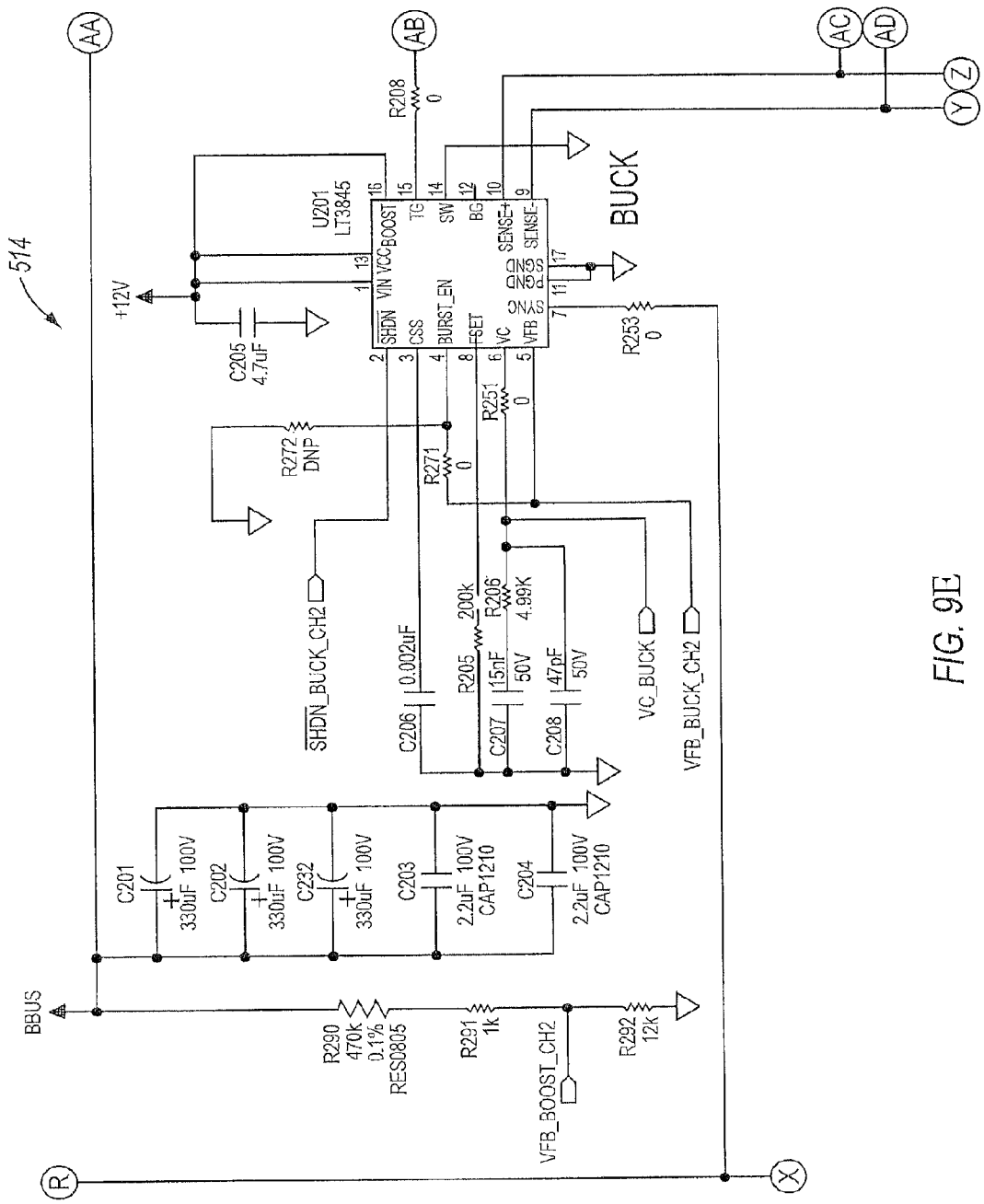
Figure 9F:
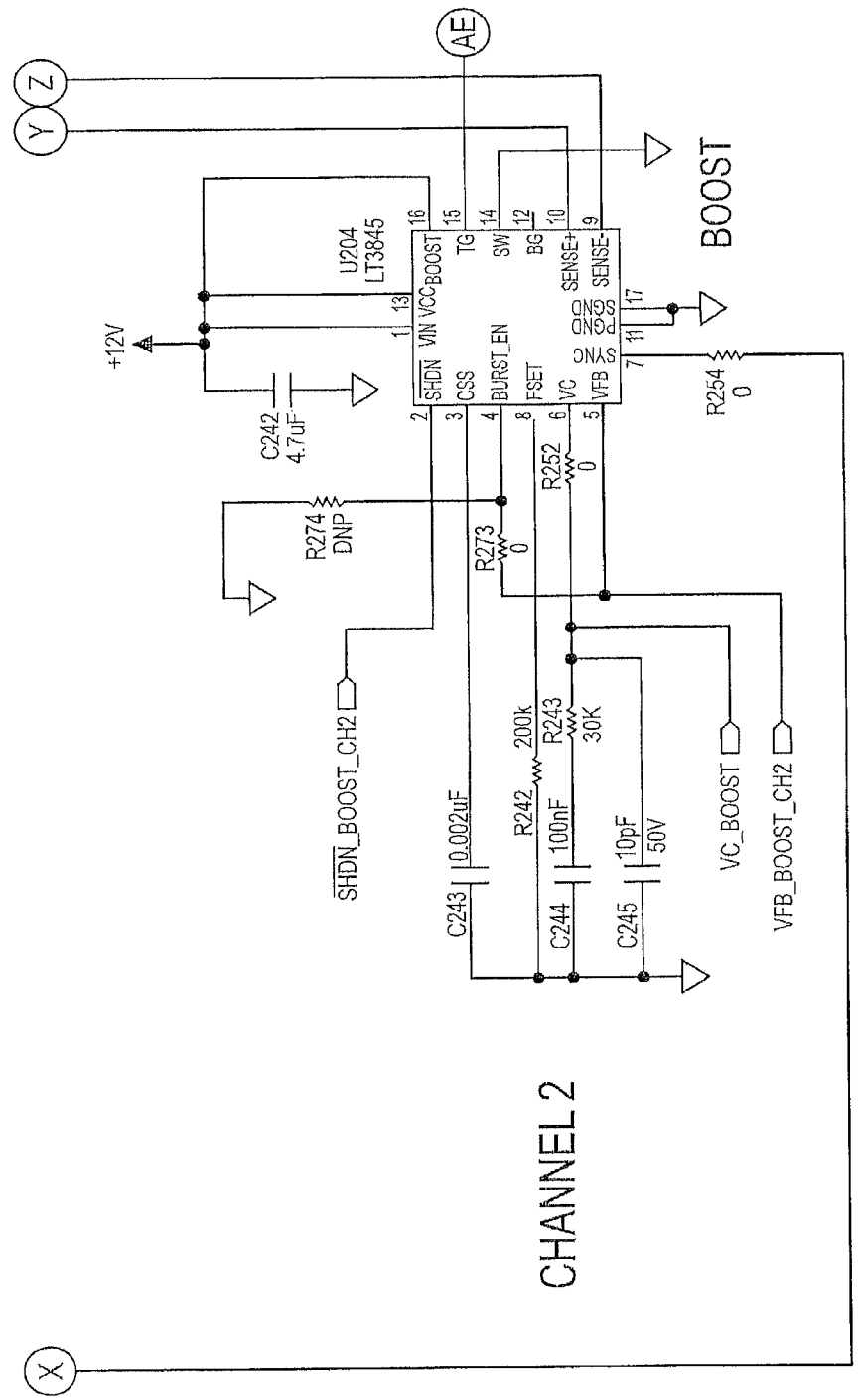
Figure 9G:
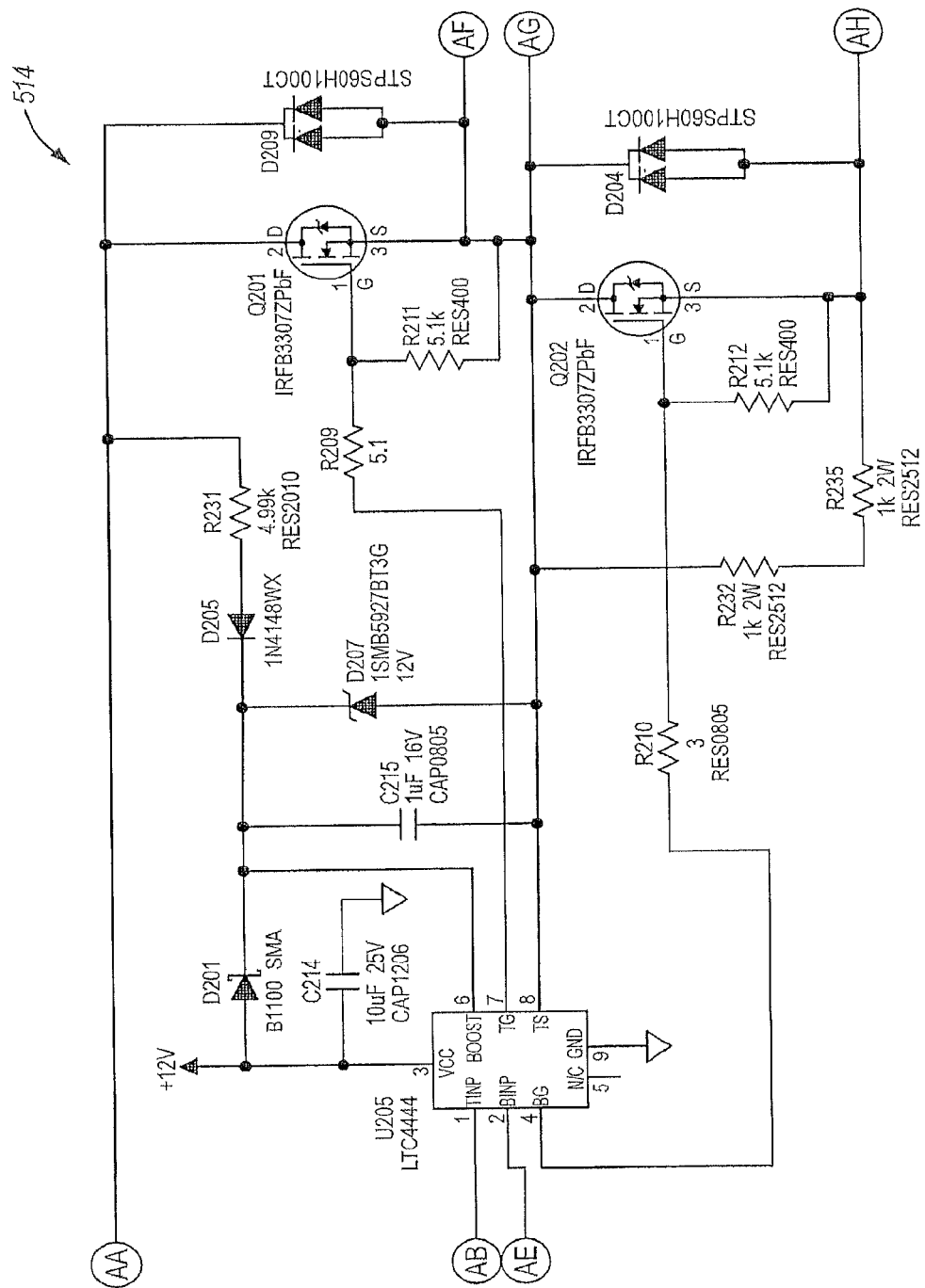
Figure 9H:
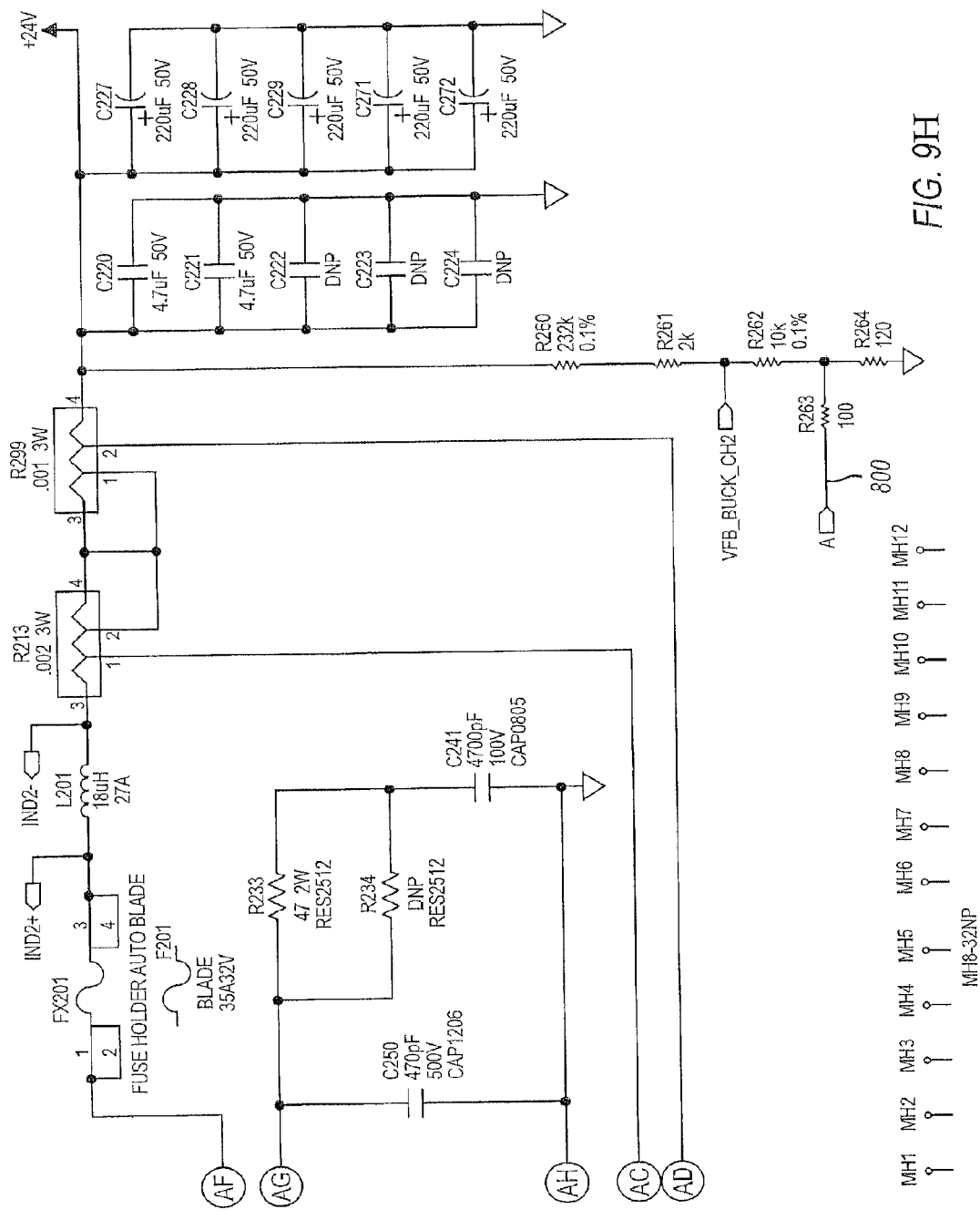
Figure 9I:
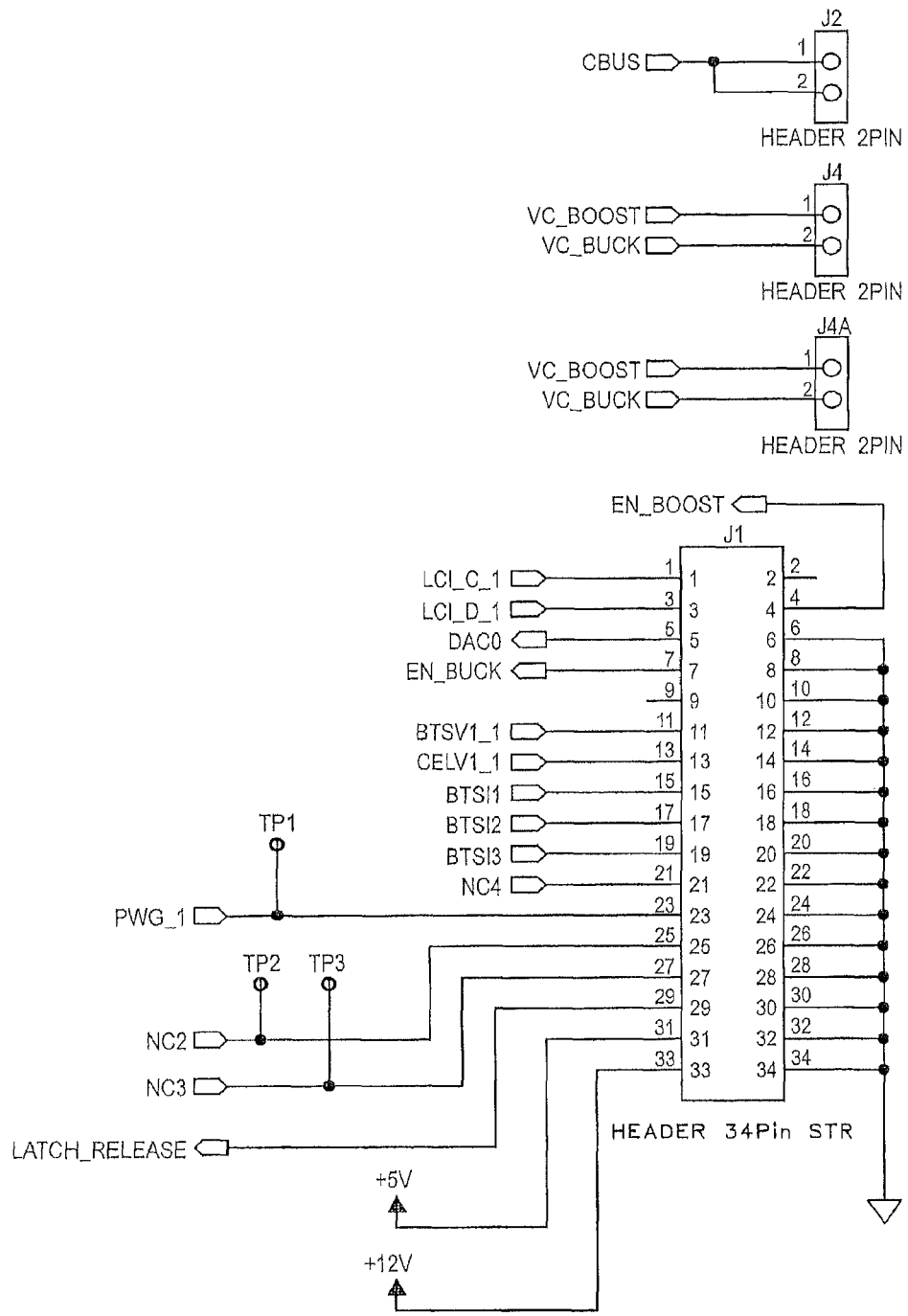
Figure 10A:
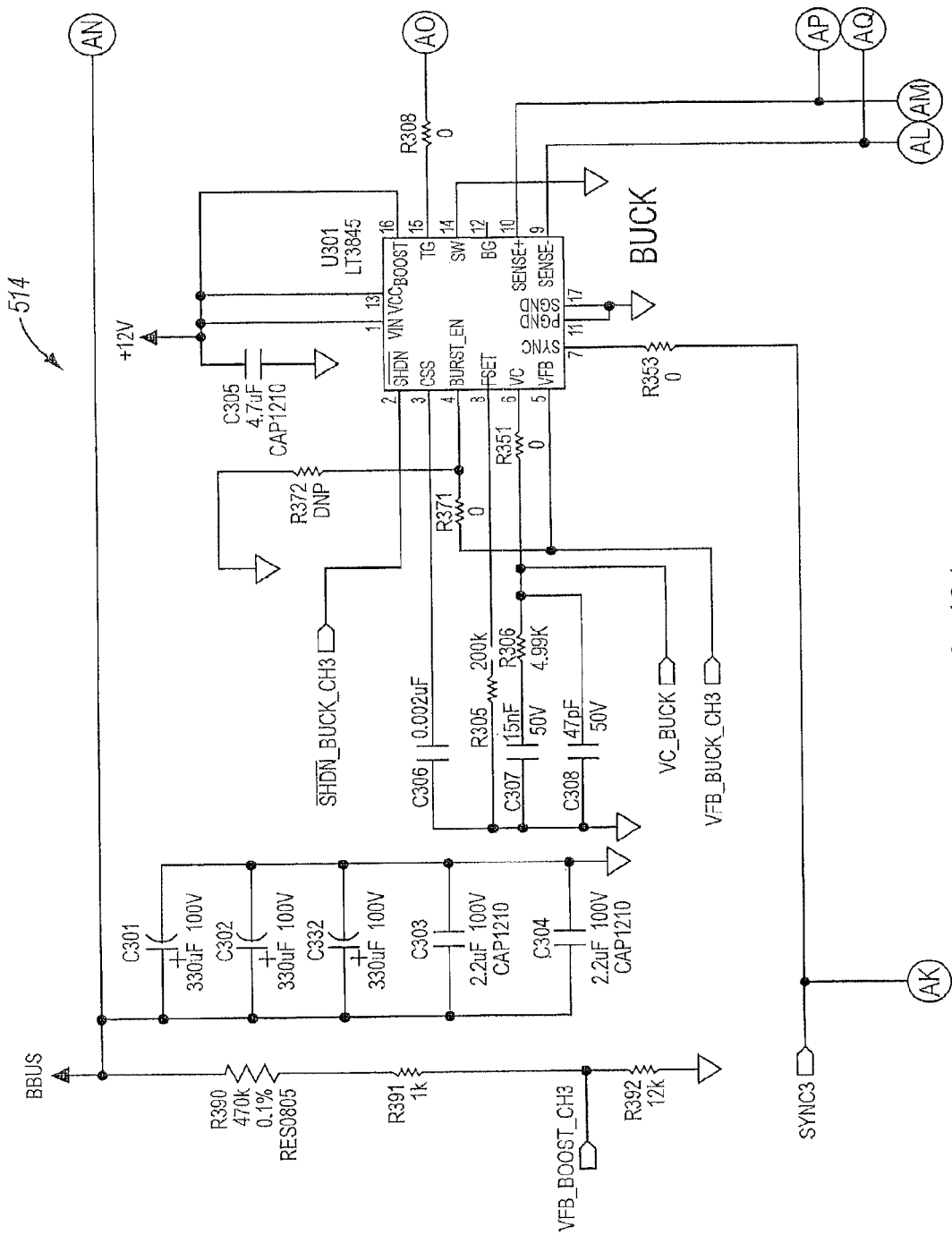
Figure 10B:
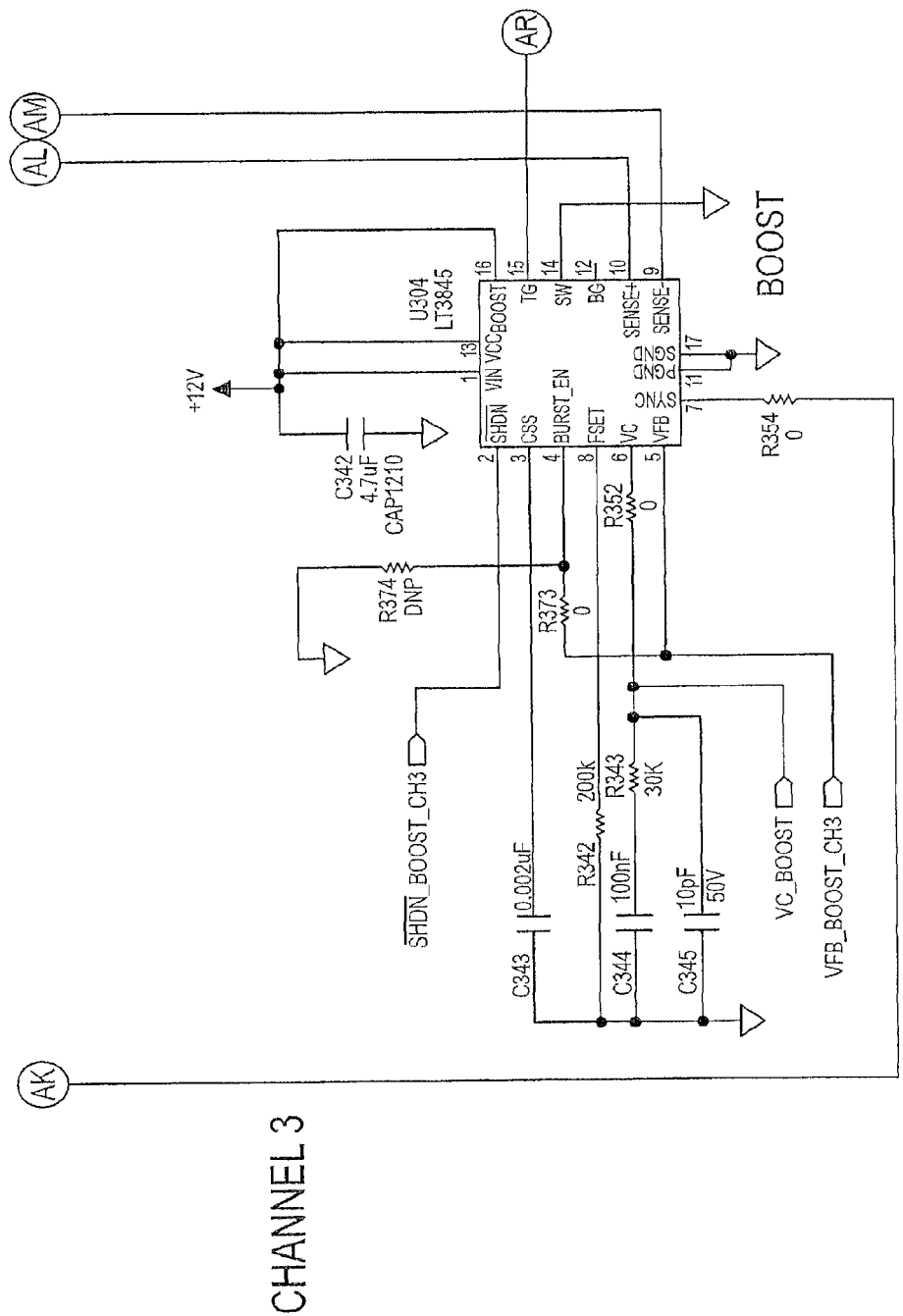
Figure 10C:
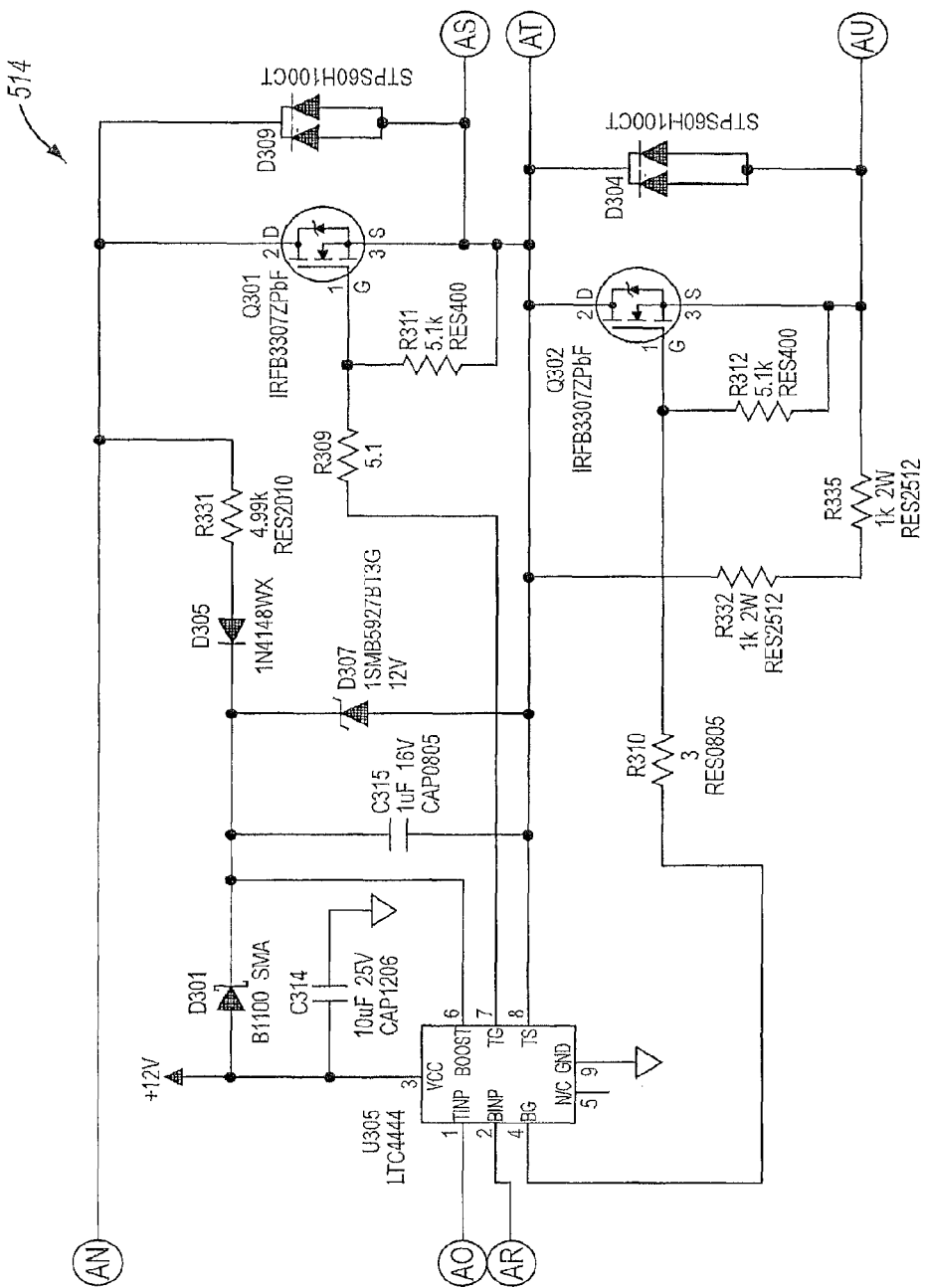
Figure 10D:
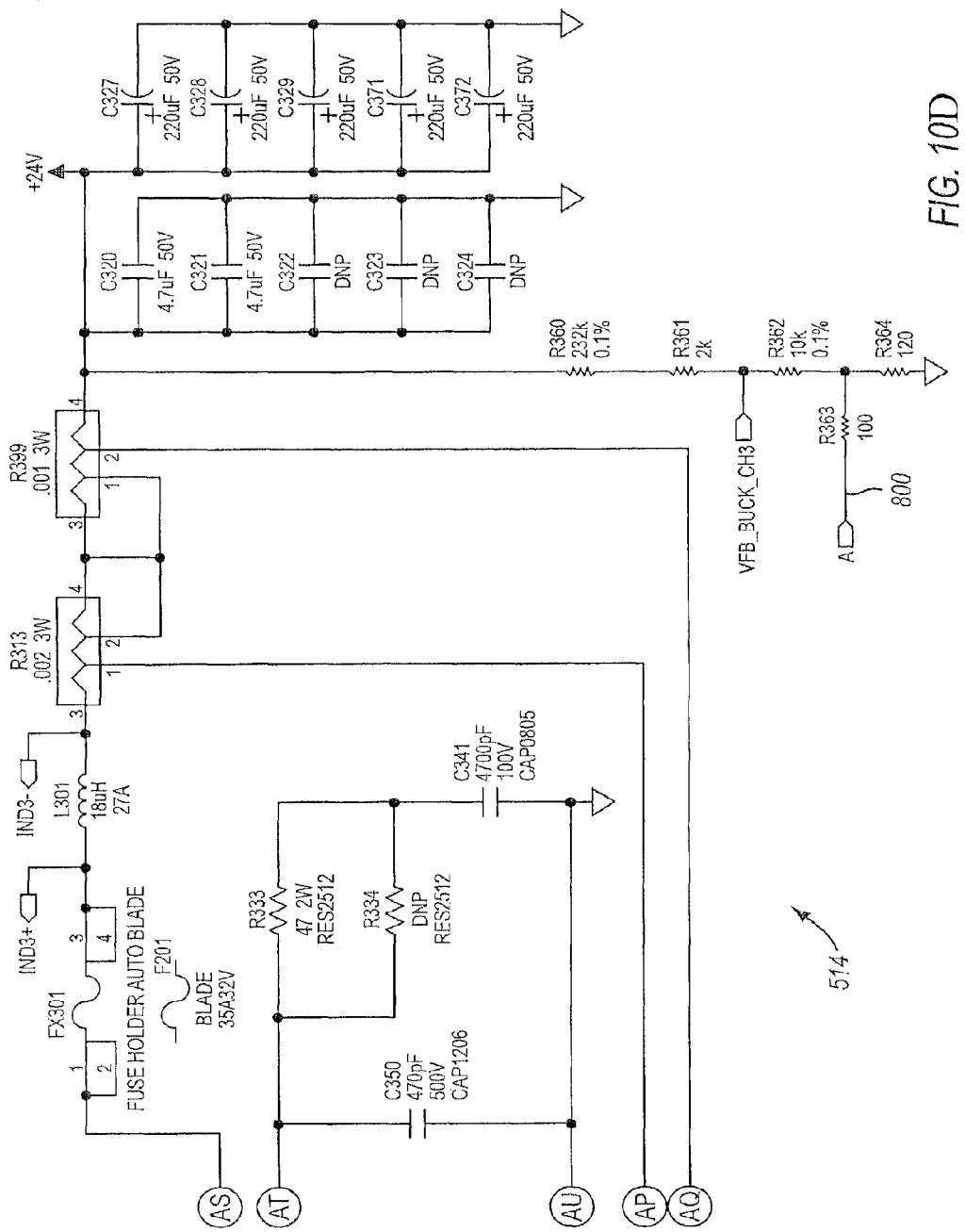
Figure 10E:
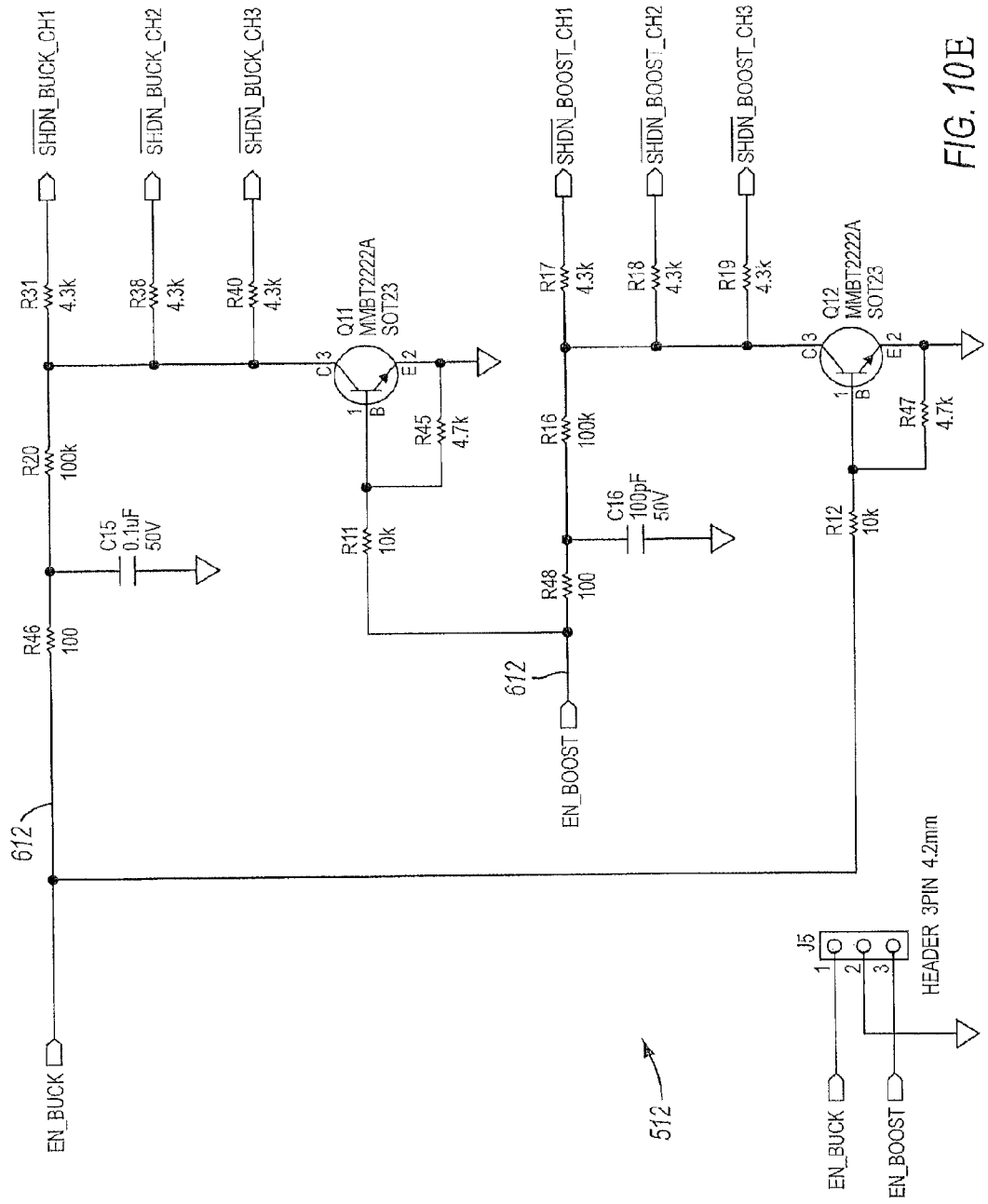
Figure 10F:
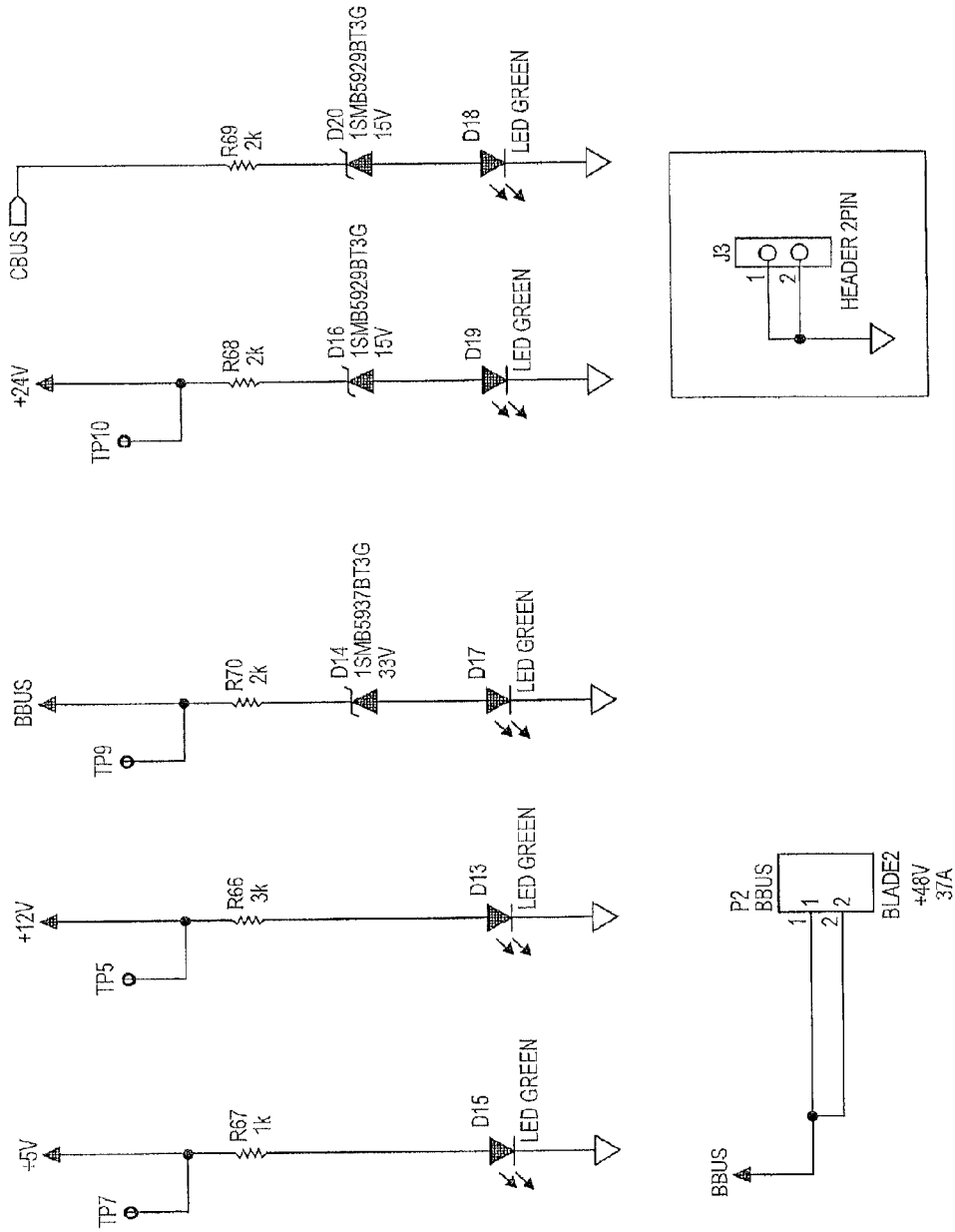

FIG. 7 illustrates an embodiment of buck-boost converter 514. As shown in FIG. 7, inductor 706 is serially coupled to resistor 708. A buck switch 710 and a boost switch 712 is coupled between resistor 708 and terminal 516. Diodes 716 and 718 are coupled in parallel to switches 710 and 712, respectively. As shown in FIG. 7, a buck controller 702 controls buck switch 710 and a boost controller 704 controls boost switch 712. Buck controller 702 activates buck switch 710 when Buck_EN is on and boost controller 704 controls boost switch 712 when Boost_EN is on. A Buck_V signal controls the voltage generated by buck-boost converter 514 during buck mode. A Sync signal is provided as a timing signal to buck controller 702 and boost controller 704. In an embodiment, buck controller 702 and boost controller 704 may receive a current feedback from resistor 708. As shown in FIG. 7, each of the three buck-boost converters 514 can be provided with a sync signal that is phased such that each is 120 degrees out of phase. A voltage across the inductor 706 (Section DET) can be provided indicating the performance of the buck boost circuit 514 to the control circuit 508, which may generate corresponding section detect signals 606 to the monitor and control circuit 330. The section detect signals 606 may thus indicate whether or not buck-boost converter 514 is operating. Buck-boost circuit 514 may also include a feedback control circuit for modifying a buck feedback voltage to the buck controller 702 using the Buck_V voltage, to control the voltage generated during buck operation.

In an embodiment, a fuse may be provided for each buck-boost converter 514, or for each buck-boost circuit 310. The fuse may be in series with the inductor 706 and may blow if the buck-boost converter fails. Thus, the current in the inductor 706 may drop to zero when the fuse blows and the failure of the buck-boost converter 514 may be detected by measuring the Section DET voltage (at peak). The failure of the buck-boost converter 514 does not affect the performance of other buck-boost converters 514, or other buck-boost circuits 310 which may be coupled together.

Accordingly, some embodiments as disclosed herein may provide a buck-boost circuit which provides a rapid switch between buck operations and boost operations. Some embodiments as disclosed herein may also provide short circuit protection of a buck-boost converter using a controller. Some embodiments as disclosed herein may provide buck-boost control wherein a feedback voltage to the buck control and the boost control are lifted from a ground to provide a faster response. Moreover, some embodiments as disclosed herein may provide buck-boost control having added redundancies for safety and bi-directional functionality.

FIGS. 8A-8G, 9A-9I, and 10A-10F illustrate a circuit diagram of one embodiment of the buck-boost circuit 310 in greater detail. Portions of the circuit diagram that correspond to the components illustrated in FIGS. 5, 6, and 7 are illustrated and numbered on the diagram. The control circuit 508 may generally include various circuitry illustrated across FIGS. 8A-8G, 9A-9I, and 10A-10F. Accordingly, portions of the circuit diagram that correspond to portions of the control circuit 508 are indicated with the numeral 508 with a letter postfixed thereon.

FIGS. 8A-8G illustrate the surge current supplier 504 as two polyfuses in parallel (see dash-boxed elements labeled 504 in FIGS. 8A-8G). Other embodiments may include more or fewer polyfuses in any parallel or series combination as desired. The current sensing circuit 506 (dashed box labeled 506 in FIGS. 8A-8G) is also illustrated, generating current monitoring signals 610 (labeled LCI_C_1 and LCI_D_1 in FIGS. 8A-8G). The current limiter circuit 510 is illustrated in FIGS. 8A-8G (dashed box labeled 510). As mentioned previously, if the current limiter circuit 510 has latched off, the latch_release signal 614 may be asserted to enable the buck-boost circuit 310 again. In some embodiments, the transistor controlled by the latch_release signal may be considered part of the control circuit 508. In other embodiments, the transistor controlled by the latch_release signal may be considered part of the current limiter circuit 510 and the latch_release signal may be provided directly to the current limiter circuit 510 as illustrated in FIG. 5.

A set of three amplifier circuits 508A may receive the voltages measured across the inductors 706 of each buck-boost converter 514 and may generate the section detect signals 606 (labeled BTSI1, BTSI2, and BTSI3 in FIGS. 8A-8G). Additionally, a current amplifier 508B is illustrated in FIGS. 8A-8G, coupled to receive the Buck_V voltage 616 and to provide current drive capability on an output node 800 in FIGS. 8A-8G. The output node 800 is used in the buck-boost converters 514 discussed in more detail below. A voltage generator 508C is provided to generate a 12 volt voltage based on the Bbus and Cbus voltages.

FIGS. 9A-9I illustrate two of the buck-boost converters 514, and a third buck-boost converter 514 is illustrated in FIGS. 10A-10F. The components of one of the buck-boost converters 514 are labeled to correspond with FIG. 7, and similar components are included in the other buck-boost converters 514. Specifically, the buck controller 702 and the boost controller 704 are illustrated in FIGS. 9A-9I. In this embodiment, each controller may include an LT3845 High Voltage Synchronous Current Mode Step-Down Controller available from Linear Technology Corporation. The LT3845 does not output voltages as high as the Bbus and Cbus can reach, and thus an LTC4444 high voltage driver 802 may be used to increase the voltage levels as needed. The buck on switch 710 and boost on switch 712 are implemented as transistors in the illustrate embodiment, each in parallel with a diode 716 and 718. The inductor 706 and current feedback resistor 708 are also illustrated.

In buck mode, current flows from the Bbus to the Cbus to charge the flow cell battery 312. Additionally, buck-boost converter 514 is attempting to produce a specified voltage on the Cbus during the charging activity (depending on whether the state machine is in plating state 403, charging state 404, or floating state 405, for example). Accordingly, the feedback voltage to the buck controller 702 is provided from the Cbus (reference numeral 900). In particular, the feedback voltage 900 is tapped from a resistor divider network including resistors 902. In this embodiment, 4 resistors are used having exemplary values 2.32 kilo-ohms (kohms), 2 kohms, 10 kohms, and 120 ohms from top to bottom in FIGS. 9A-9I. Any number of resistors and values may be used in various embodiments, providing a known ratio of the buck feedback voltage to the Cbus voltage.

As mentioned previously, the Buck_V control voltage may be used to adjust the feedback voltage provided to the buck controller 702, to control the voltage on the Cbus. The output node 800 from FIGS. 8A-8G are coupled to another resistor 904 (exemplary value 100 ohms in this embodiment) to inject additional current into the resistor divider formed from resistors 902. The effect is to increase the feedback voltage to the buck controller 702 (reference numeral 900) when the Buck_V voltage is increased. Accordingly, the monitor and control circuit 330 may provide voltage control to the buck-boost circuit 310, and the buck-boost circuit 310 may provide current control internally responsive to the voltage control.

Similarly, the feedback voltage for the boost controller 704 is measured from the Bbus (since that is the output voltage in boost mode in this embodiment), indicated at reference numeral 906. A resistor divider network from the Bbus may be used to scale the feedback voltage 906 as well. In other embodiments, a Boost_V voltage to adjust the boost feedback voltage may be implemented if desired, similar to the Buck_V voltage discussed above.

FIGS. 9A-9I also illustrate the voltage monitor signals 608 for the Bbus and Cbus (reference numeral 608A and 608B in FIGS. 9A-9I, labeled BSTVI_1 and CELVI1, respectively). In this embodiment, the monitor voltages are also scaled via resistor divider networks.

The sync signal generator 508D is also illustrated in FIGS. 9A-9I. The sync signal generator 508D may generate the Sync signals for each buck-boost converter 514. In the illustrated embodiment, the sync signal generator 508D comprises an LTC6902 Multiphase Oscillator available from Linear Technology Corporation.

FIGS. 10A-10F illustrate the third buck-boost converter 514, as well as the buck-boost on-off circuit 512. The circuit 512 is coupled to receive the Buck_EN and Boost_EN signals 612, and asserts (low) shutdown signals to each buck controller 702 and boost controller 704 responsive to the signals. Particularly, if both Buck_EN and Boost_EN are asserted concurrently, the circuit 512 may shut down all controllers 702 and 704. Otherwise, if the Buck_EN signal is asserted and the Boost_EN is deasserted, the shutdown signals to the buck controllers 702 are deasserted and the shutdown signals to the boost controllers 704 are asserted, establishing buck mode. If the Boost_EN signal is asserted and the Buck_EN signal is deasserted, the shutdown signals to the boost controllers 704 are deasserted and the shutdown signals to the buck controllers 702 are asserted, establishing boost mode. If both Buck_EN and Boost_EN signals are deasserted, all shutdown signals may be asserted and the circuit 310 may be idle.

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A buck-boost circuit comprising:
a plurality of buck-boost converters coupled in parallel between a first power bus and a second power bus;
a control circuit coupled to the plurality of buck-boost converters, wherein the control circuit is configured to generate one or more signals indicative of operation of the plurality of buck-boost converters; and
a second circuit configured to monitor the one or more signals from the control circuit, wherein the second circuit is configured to detect a failure of a first buck-boost converter of the plurality of buck-boost converters in response to the one or more signals, and wherein the second circuit is configured to control remaining ones of the plurality of buck-boost converters to supply power to at least one of the first power bus and the second power bus;
wherein:
each of the plurality of buck-boost converters comprise an inductor;
the control circuit is configured to monitor a voltage across the inductor in each of the plurality of buck-boost converters to generate the one or more signals;
a peak voltage across the inductor of zero indicates the failure; and
the control circuit is configured to generate a corresponding one of the one or more signals to indicate the failure in response to the peak voltage of zero.

2. The buck-boost circuit as recited in claim 1 further comprising a current limiter circuit configured to limit a current to the plurality of buck-boost converters to a defined maximum value.

3. The buck-boost circuit as recited in claim 2 wherein the current limiter circuit is configured to latch off if the current to the plurality of buck-boost converters reaches the defined maximum value, and wherein the current limiter circuit is coupled to receive a latch release signal configured to cause the current limiter circuit to enable from being latched off, and wherein the second circuit is configured to generate the latch release signal.

4. The buck-boost circuit as recited in claim 1 wherein the second circuit is configured to generate a buck enable control signal to enable buck mode in the plurality of buck-boost converters and a boost enable control signal to enable boost mode in the plurality of buck boost converters, and wherein the control circuit is coupled to receive the buck enable control signal and the boost enable control signal, and wherein the control circuit is configured to disable the plurality of buck-boost converters responsive to concurrent assertion of the buck enable control signal and the boost enable control signal by the second circuit.

5. The buck-boost circuit as recited in claim 1 further comprising a surge current circuit coupled in parallel with the plurality of buck-boost converters, wherein the surge current circuit is configured to supply current during a power on event on one of the first power bus and the second power bus during use, wherein the surge current circuit comprises at least one polyfuse.

6. The buck-boost circuit as recited in claim 5 wherein the at least one polyfuse increases in temperature when supplying a surge current during use, and wherein the polyfuse is configured to create an open circuit in response to reaching a predetermined temperature during use.

7. The buck-boost circuit as recited in claim 1 wherein:
a first buck-boost converter is configured to:
generate a voltage on the first power bus responsive to a voltage on the second power bus in a boost mode; and
generate the voltage on the second power bus responsive to the voltage on the first power bus in a buck mode;
the first buck-boost converter comprises:
an inductor;
a first node;
a first switch in parallel with a first power diode between the second power bus and the first node, wherein the first switch is configured to be closed in the buck mode and the first power diode is distinct from the first switch; and
a second switch in parallel with a second power diode between the first node and ground, wherein the second switch is configured to be closed in the boost mode and the second power diode is distinct from the second switch.

8. The buck-boost circuit as recited in claim 7 wherein the first buck-boost converter further comprises a buck controller configured to generate a first control signal to the first switch, wherein the first switch is configured to be open or closed responsive to the first control signal.

9. The buck-boost circuit as recited in claim 8 wherein the buck controller is coupled to receive a feedback voltage generated by a feedback circuit responsive to the voltage on the second power bus during use, and wherein the feedback circuit is coupled to receive an adjustable control signal and is configured to modify the feedback voltage responsive to the control signal.

10. The buck-boost circuit as recited in claim 9 wherein the buck controller is configured to change a magnitude of the voltage on the second power bus responsive to the feedback voltage, and wherein the modification of the feedback voltage causes the buck controller to modify the voltage on the second power bus during use.

11. The buck-boost circuit as recited in claim 7 wherein the first buck-boost converter further comprises a boost controller configured to generate a control signal to the second switch, wherein the second switch is configured to be open or closed responsive to the control signal.

12. The buck-boost circuit as recited in claim 1 wherein the second circuit is further configured to generate a plurality of sync signals, wherein each of the sync signals provides timing for a respective one of the buck-boost converters and each of the sync signals is out of phase with each other.

13. A buck-boost circuit comprising:
a plurality of buck-boost converters coupled in parallel between a first power bus and a second power bus;
a control circuit coupled to the plurality of buck-boost converters, wherein the control circuit is configured to generate one or more signals indicative of operation of the plurality of buck-boost converters;
a second circuit configured to monitor the one or more signals from the control circuit, wherein the second circuit is configured to detect a failure of a first buck-boost converter of the plurality of buck-boost converters in response to the one or more signals, and wherein the second circuit is configured to control remaining ones of the plurality of buck-boost converters to supply power to at least one of the first power bus and the second power bus; and a current limiter circuit configured to limit a current to the plurality of buck-boost converters to a defined maximum value;

wherein:
the current limiter circuit is configured to latch off if the current to the plurality of buck-boost converters reaches the defined maximum value; and the current limiter circuit is coupled to receive a latch release signal configured to cause the current limiter circuit to enable from being latched off, and wherein the second circuit is configured to generate the latch release signal.

14. The buck-boost circuit as recited in claim 13 wherein:
each of the plurality of buck-boost converters comprise an inductor; and the control circuit is configured to monitor a voltage across the inductor in each of the plurality of buck-boost converters to generate the one or more signals.

15. The buck-boost circuit as recited in claim 14 wherein:
a peak voltage across the inductor of zero indicates the failure; and the control circuit is configured to generate a corresponding one of the one or more signals to indicate the failure in response to the peak voltage of zero.

16. The buck-boost circuit as recited in claim 13 wherein:
the second circuit is further configured to generate a plurality of sync signals; and each of the sync signals provides timing for a respective one of the buck-boost converters and each of the sync signals is out of phase with each other.

17. A buck-boost circuit comprising:
a plurality of buck-boost converters coupled in parallel between a first power bus and a second power bus;

a control circuit coupled to the plurality of buck-boost converters, wherein the control circuit is configured to generate one or more signals indicative of operation of the plurality of buck-boost converters;

a second circuit configured to monitor the one or more signals from the control circuit, wherein the second circuit is configured to detect a failure of a first buck-boost converter of the plurality of buck-boost converters in response to the one or more signals, and wherein the second circuit is configured to control remaining ones of the plurality of buck-boost converters to supply power to at least one of the first power bus and the second power bus; and a surge current circuit coupled in parallel with the plurality of buck-boost converters;

wherein:
the surge current circuit is configured to supply current during a power on event on one of the first power bus and the second power bus during use; and the surge current circuit comprises at least one polyfuse.

18. The buck-boost circuit as recited in claim 17 wherein:
the at least one polyfuse increases in temperature when supplying a surge current during use; and the polyfuse is configured to create an open circuit in response to reaching a predetermined temperature during use.

19. The buck-boost circuit as recited in claim 17 wherein:
each of the plurality of buck-boost converters comprise an inductor;

the control circuit is configured to monitor a voltage across the inductor in each of the plurality of buck-boost converters to generate the one or more signals;

a peak voltage across the inductor of zero indicates the failure; and the control circuit is configured to generate a corresponding one of the one or more signals to indicate the failure in response to the peak voltage of zero.

20. The buck-boost circuit as recited in claim 17 wherein:
the second circuit is further configured to generate a plurality of sync signals; and each of the sync signals provides timing for a respective one of the buck-boost converters and each of the sync signals is out of phase with each other.

* * * * *